US008842379B2

(12) United States Patent
Hsu et al.

(10) Patent No.: US 8,842,379 B2
(45) Date of Patent: Sep. 23, 2014

(54) IMAGE CAPTURING LENS ASSEMBLY

(71) Applicant: LARGAN Precision Co., Ltd., Taichung (TW)

(72) Inventors: Chih-Wen Hsu, Taichung (TW); Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 6 days.

(21) Appl. No.: 13/762,884

(22) Filed: Feb. 8, 2013

(65) Prior Publication Data

US 2014/0078601 A1  Mar. 20, 2014

(30) Foreign Application Priority Data

Sep. 19, 2012 (TW) .............................. 101134369 A

(51) Int. Cl.
*G02B 9/34* (2006.01)
*G02B 13/18* (2006.01)
*G02B 13/00* (2006.01)
*G02B 13/22* (2006.01)
*G02B 13/06* (2006.01)

(52) U.S. Cl.
CPC ............... *G02B 9/34* (2013.01); *G02B 13/004* (2013.01); *G02B 13/00* (2013.01); *G02B 13/18* (2013.01); *G02B 13/22* (2013.01); *G02B 13/06* (2013.01)
USPC .......................................... 359/781; 359/753

(58) Field of Classification Search
CPC .............. G02B 9/00; G02B 9/34; G02B 9/60; G02B 9/62; G02B 9/64; G02B 13/18
USPC ......... 359/753, 781, 708–715, 749, 754–756, 359/761, 763, 770, 771
See application file for complete search history.

(56) References Cited

U.S. PATENT DOCUMENTS 7,145,736 B2    12/2006 Noda
7,660,049 B2 *   2/2010 Tang .............................. 359/781
(Continued)

FOREIGN PATENT DOCUMENTS

TW    201109712 A    3/2011
TW    201224568 A    6/2012

OTHER PUBLICATIONS

Intellectual Property Office, Ministry of Economic Affairs, R.O.C., "Office Action", Apr. 25, 2014, Taiwan.

*Primary Examiner* — Darryl J Collins
(74) *Attorney, Agent, or Firm* — Morris Manning & Martin LLP; Tim Tingkang Xia, Esq.

(57) ABSTRACT

An image capturing lens assembly includes, in order from an object-side to an image-side along an optical axis, a first lens element, a second lens element, a third lens element and a fourth lens element. The first lens element with negative refractive power has an image-side surface being concave at a paraxial region. The second lens element with positive refractive power has an image-side surface being convex at a paraxial region. The third lens element with negative refractive power has an object-side surface being concave at a paraxial region, and an image-side surface being convex at a paraxial region. The fourth lens element with positive refractive power has an object-side surface being convex at a paraxial region, and an image-side surface being concave at a paraxial region, and at least one of the object-side surface and the image-side surface is aspheric.

30 Claims, 27 Drawing Sheets

(56) References Cited

U.S. PATENT DOCUMENTS

| | | |
|---|---|---|
| 8,089,704 B2 | 1/2012 | Tang et al. |
| 8,179,616 B1 * | 5/2012 | Hsu et al. ............ 359/715 |
| 8,189,272 B1 * | 5/2012 | Huang et al. ......... 359/715 |
| 8,248,713 B2 * | 8/2012 | Hsieh et al. .......... 359/753 |

* cited by examiner

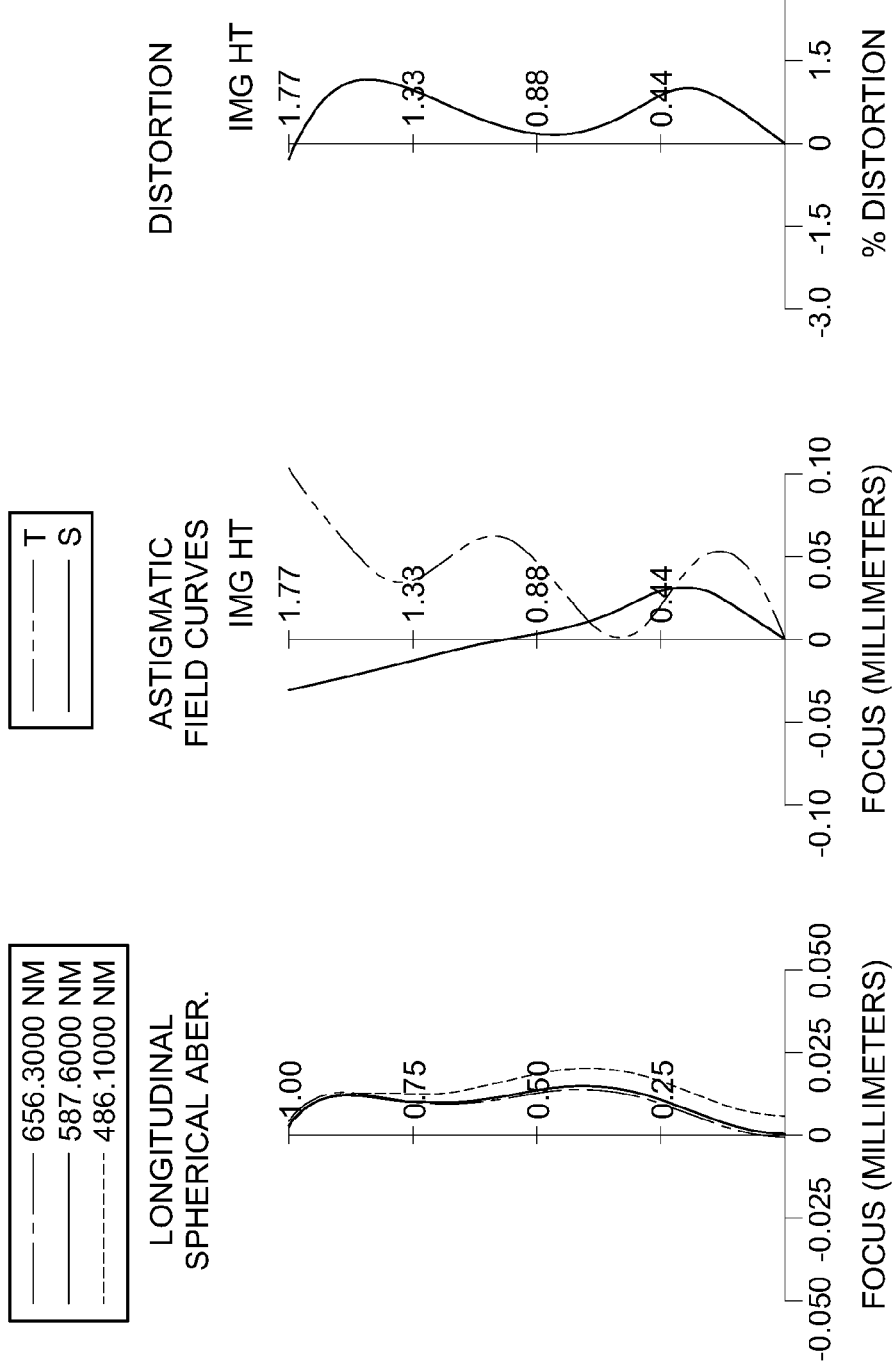

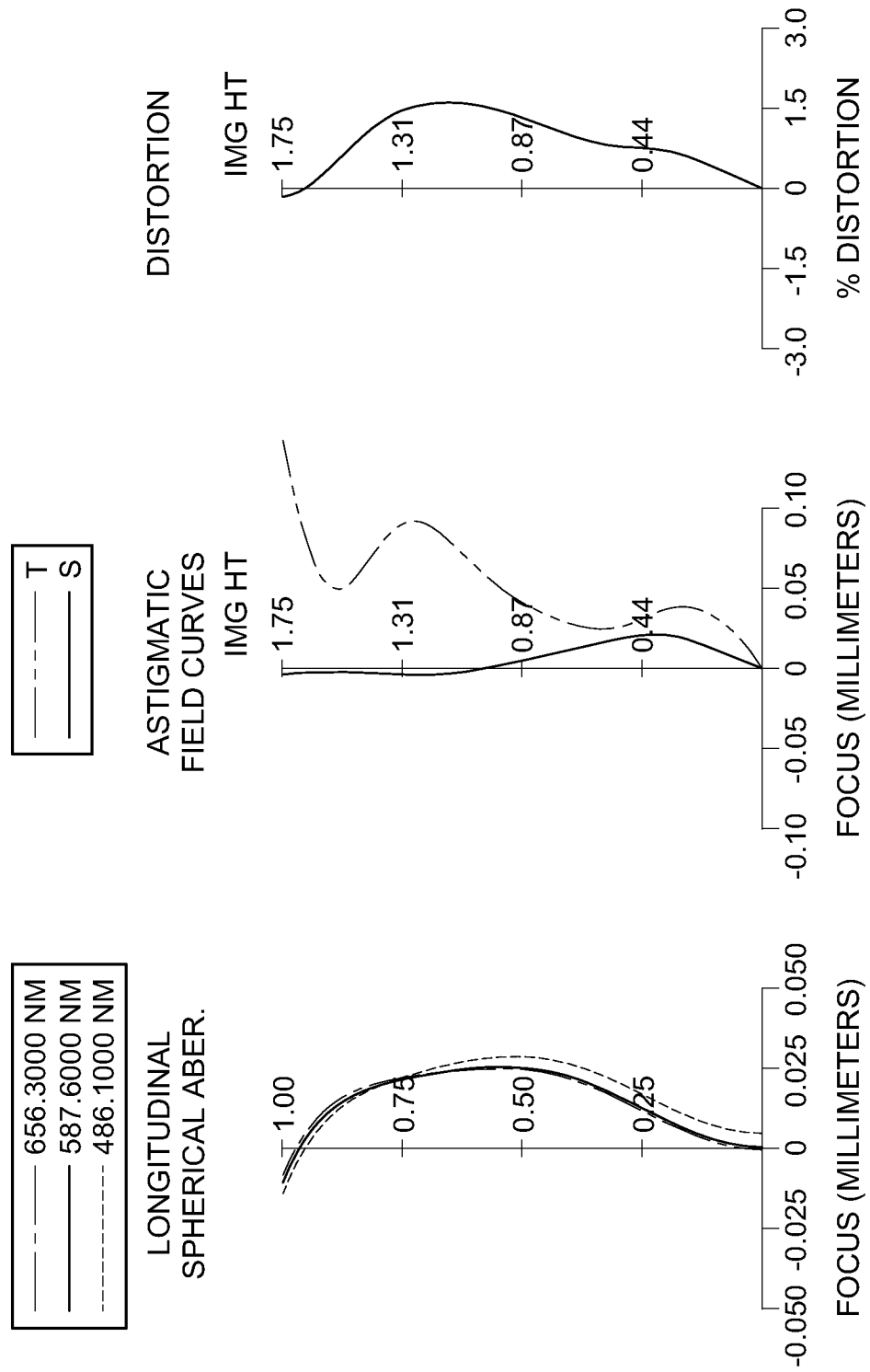

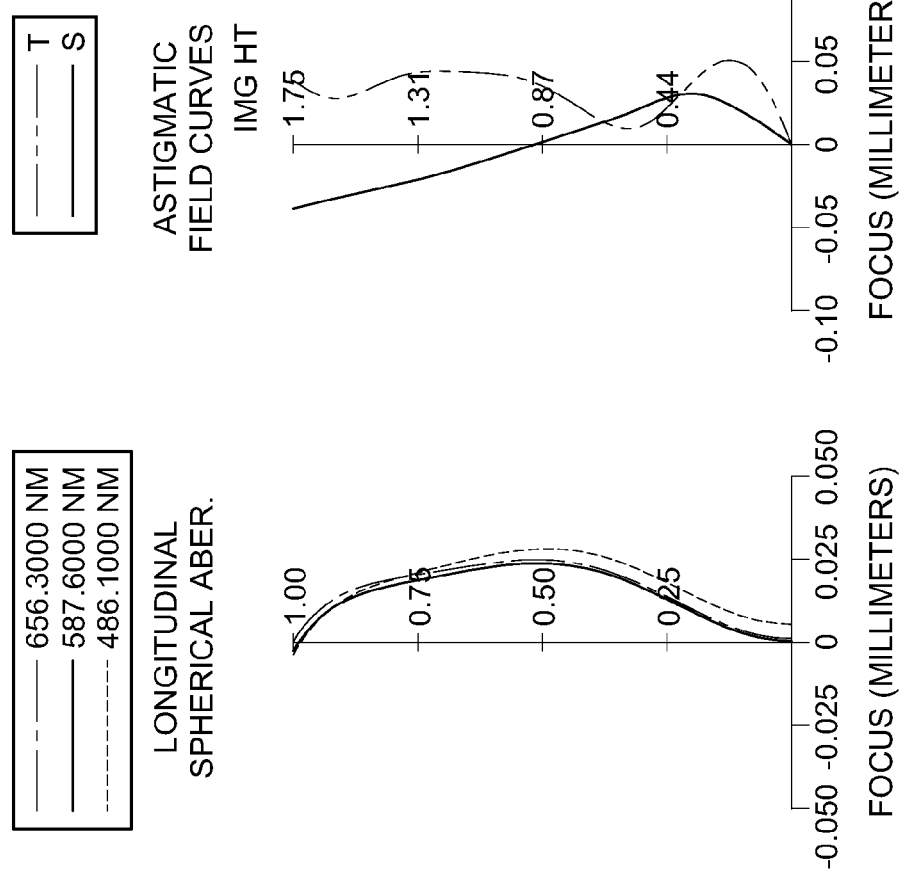

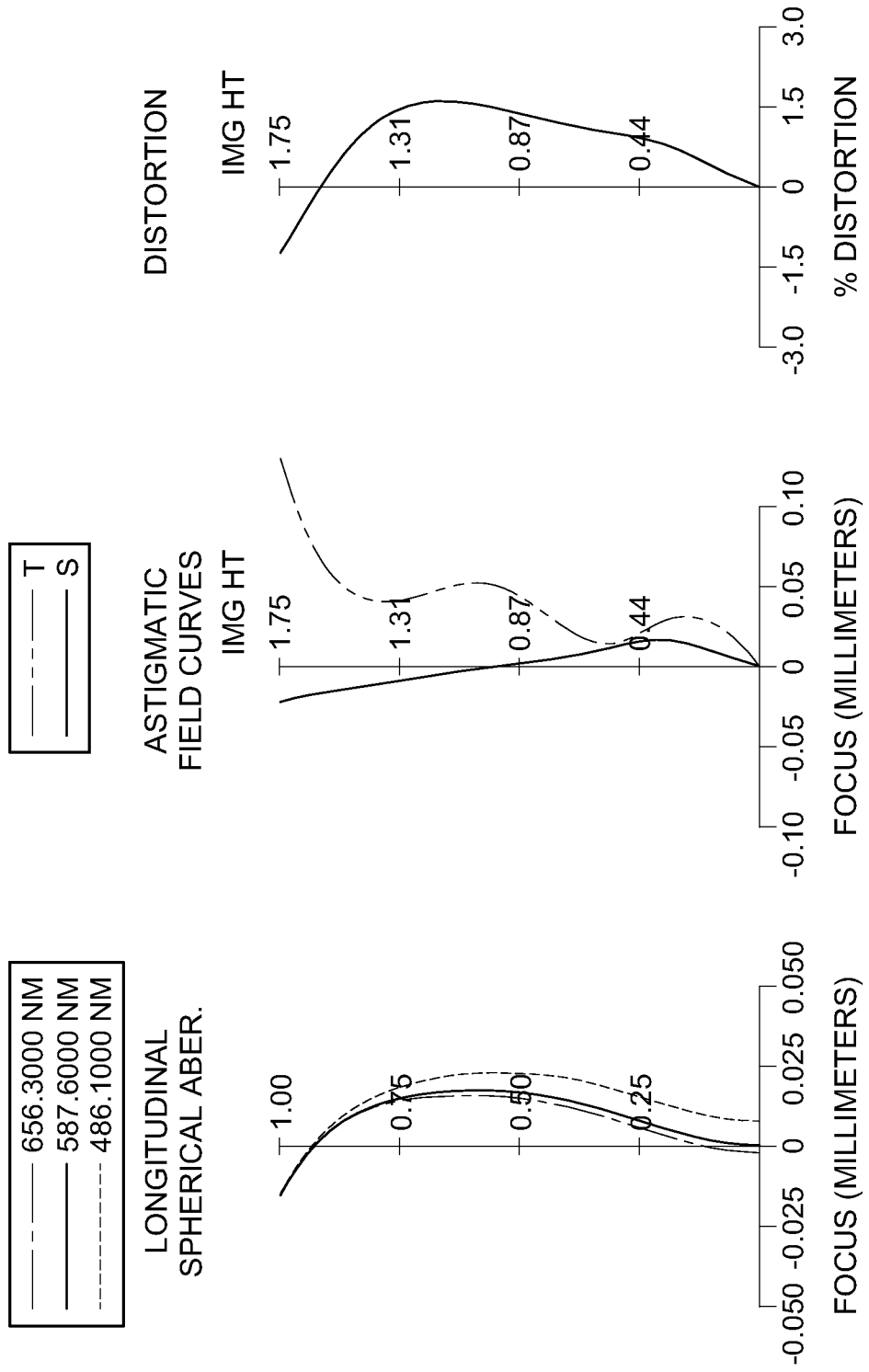

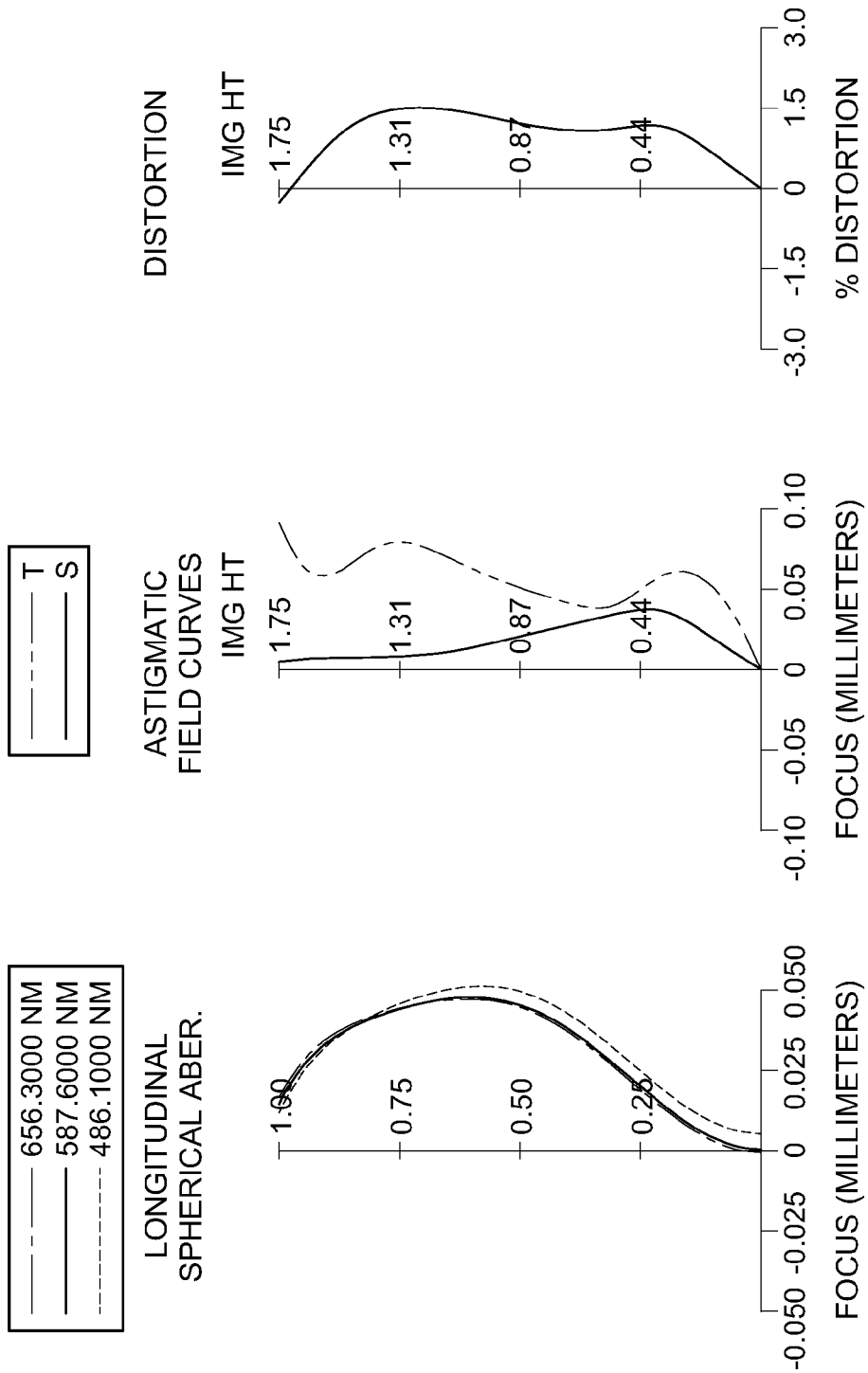

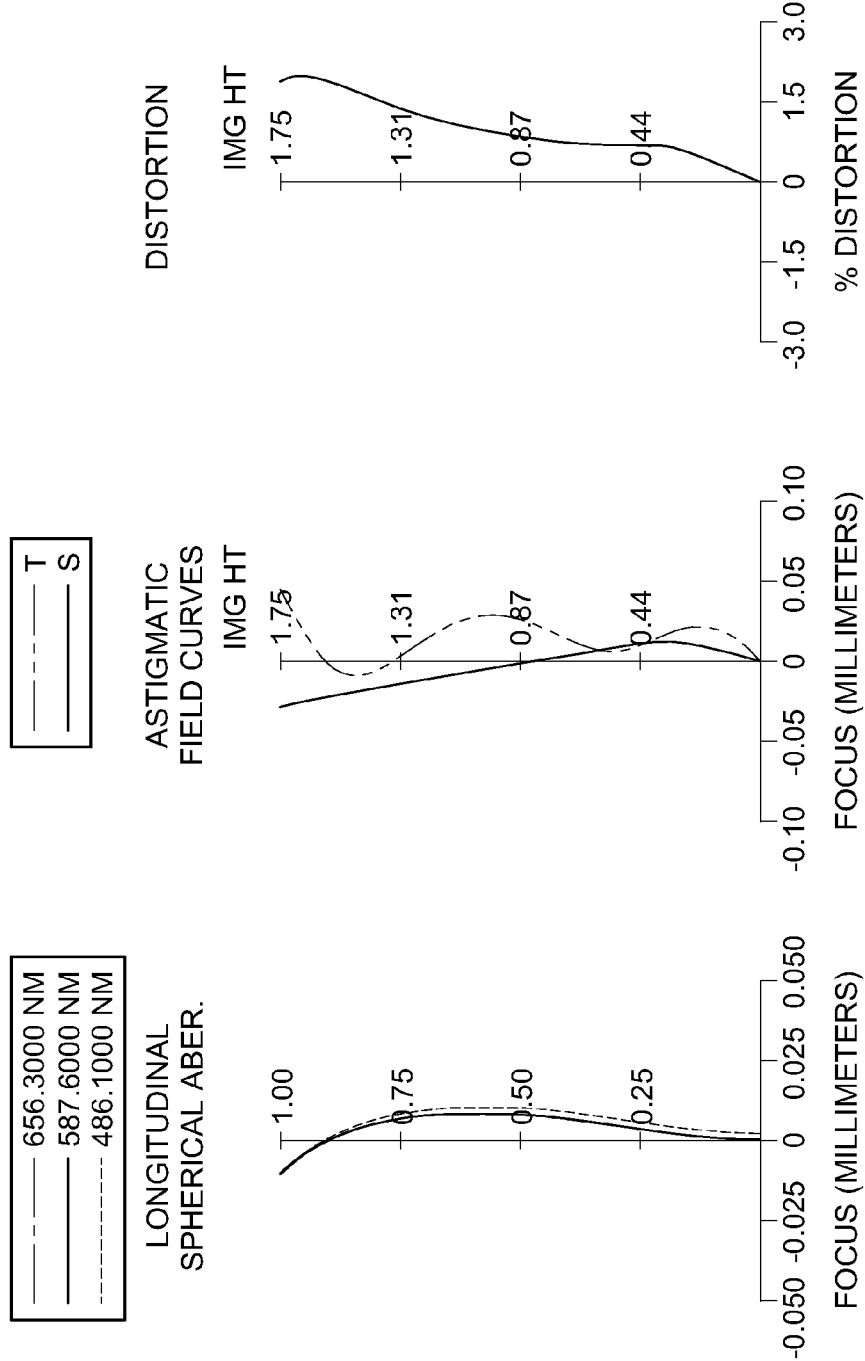

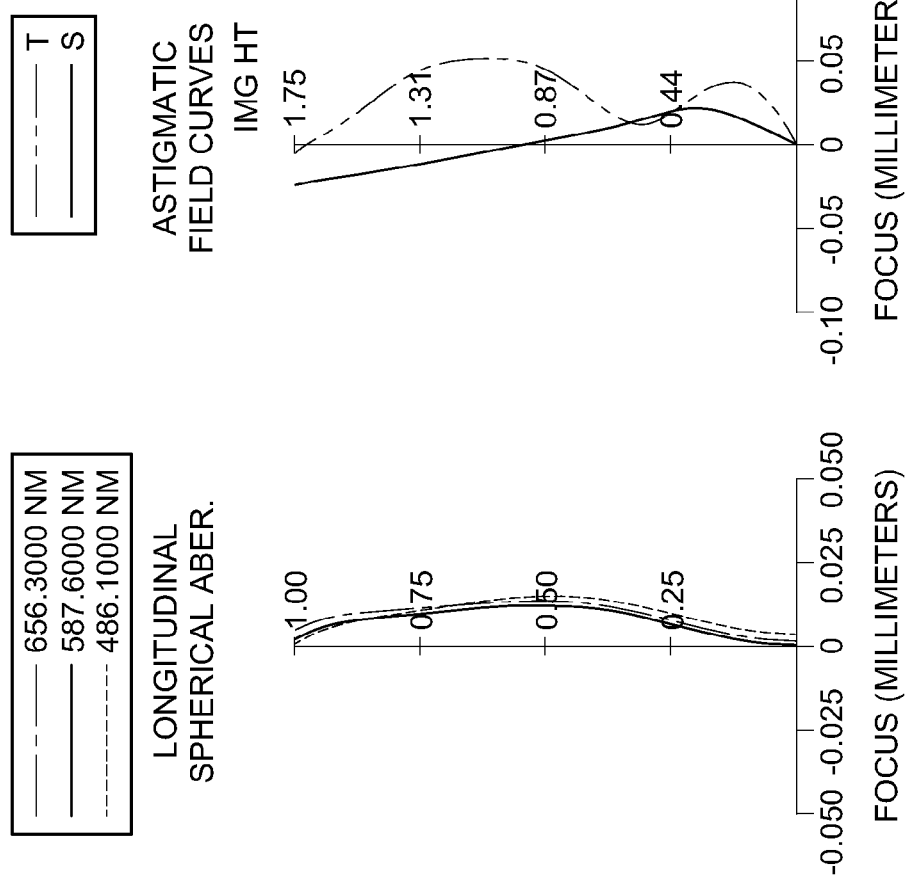

IMAGE CAPTURING LENS ASSEMBLY

CROSS-REFERENCE TO RELATED APPLICATIONS

This non-provisional application claims priority under 35 U.S.C. §119(a) on Patent Application No(s). 101134369 filed in Taiwan, R.O.C. on Sep. 19, 2012, the entire contents of which are hereby incorporated by reference.

TECHNICAL FIELD

The present disclosure relates to an image capturing lens assembly, and more particularly to an image capturing lens assembly implemented in an electronic device.

BACKGROUND

In recent years, the demand for compact optical systems increases with the popularity of portable electronic devices with photographing capability. Charge coupled devices (CCD) or complementary metal-oxide semiconductor (CMOS) sensors are two ordinary types for the photo-sensing device in an ordinary optical system. Furthermore, since the pixel size of sensors are reduced due to advances on the semiconductor manufacturing technology, and the present electronic device requires high performance, small size and lightness, Thus, a compact optical system with high image quality currently prevails over the market. For example, the conventional optical system, a three-lens assembly, implemented in the electronic device is disclosed in the specification of U.S. Pat. No. 7,145,736. With the advances of semiconductor manufacturing technology and the development of compact electronic devices, the image quality of compact optical system is highly required, but the conventional three-lens optical system may not satisfy the demand for better image quality. Accordingly, U.S. Pat. No. 8,089,704 discloses a four-lens assembly in the optical system. However, the distance differences among the lenses of the four-lens assembly results in the difficulty to minimize the size of the four-lens assembly. The refractive power of the first lens element affects the field angle of the optical system, so the region of image capturing is limited.

Therefore, it is necessary to develop an optical system with wide angle, high image quality and short total length.

SUMMARY

According to an embodiment, an image capturing lens assembly comprises, in order from an object side to an image side along an optical axis, a first lens element, a second lens element, a third lens element and a fourth lens element.

The first lens element with negative refractive power comprises an image-side surface being concave at a paraxial region, and an object-side surface. The second lens element with positive refractive power comprises an image-side surface being convex at a paraxial region, and an object-side surface. The third lens element with negative refractive power comprises an object-side surface being concave at a paraxial region, and an image-side surface being convex at a paraxial region. The fourth lens element with positive refractive power comprises an object-side surface being convex at a paraxial region, and an image-side surface being concave at a paraxial region, and at least one of the object-side and image-side surfaces of the fourth lens element is aspheric.

The image capturing lens assembly satisfies the following conditions:

$$1.05 < T12/T23 < 2.8;\text{ and}$$

$$1.25 < CT1/CT3 < 4.0;$$

wherein $T12$ is an axial distance between the first lens element and the second lens element, $T23$ is an axial distance between the second lens element and the third lens element, $CT1$ is a central thickness of the first lens element, and $CT3$ is a central thickness of the third lens element.

According to other embodiment, an image capturing lens assembly comprises, in order from an object side to an image side along an optical axis, a first lens element, a second lens element, a third lens element, a fourth lens element and an image sensor.

The first lens element with negative refractive power comprises an image-side surface concave at a paraxial region thereof, and an object-side surface. The second lens element with positive refractive power comprises an image-side surface convex at a paraxial region thereof, and an object-side surface. The third lens element with negative refractive power comprises an object-side surface concave at a paraxial region thereof, and an image-side surface convex at a paraxial region thereof. The fourth lens element with positive refractive power comprises an object-side surface convex at a paraxial region thereof, and an image-side surface, and at least one of the object-side and image-side surfaces of the fourth lens element is aspheric.

The image capturing lens assembly further comprises a stop and satisfies the following conditions:

$$1.05 < T12/T23 < 2.8;\text{ and}$$

$$1.0 < Td/ImgH < 2.0;$$

wherein $T12$ is an axial distance between the first lens element and the second lens element, $T23$ is an axial distance between the second lens element and the third lens element, $Td$ is an axial distance between the object-side surface of the first lens element and the image-side surface of the fourth lens element, and $ImgH$ is a maximum image height of the image sensor.

According to other embodiment, an image capturing lens assembly comprises, in order from an object side to an image side along an optical axis, a first lens element, a second lens element, a third lens element, a fourth lens element and an image sensor.

The first lens element with negative refractive power comprises an object-side surface convex at a paraxial region thereof, and an image-side surface concave at a paraxial region thereof. The second lens element with positive refractive power comprises an image-side surface convex at a paraxial region thereof, and an object-side surface. The third lens element with negative refractive power comprises an object-side surface concave at a paraxial region thereof, and an image-side surface convex at a paraxial region thereof. The fourth lens element with positive refractive power comprises an object-side surface convex at a paraxial region thereof, and an image-side surface, and at least one of the object-side and image-side surfaces of the fourth lens element is aspheric.

The image capturing lens assembly satisfies the following conditions:

$$1.05 < T12/T23 < 2.8;$$

$$1.0 < Td/ImgH < 2.0;\text{ and}$$

$$1.0 < CT1/CT3 < 5.0;$$

wherein T12 is an axial distance between the first lens element and the second lens element, T23 is an axial distance between the second lens element and the third lens element, Td is an axial distance between the object-side surface of the first lens element and the image-side surface of the fourth lens element, ImgH is a maximum image height of the image sensor, CT1 is a central thickness of the first lens element, CT3 is a central thickness of the third lens element, Sag42 is a distance in parallel with the optical axis from a point on the image-side surface of the fourth lens element to an axial vertex on the image-side surface of the fourth lens element, Y is an off-axis height between a point on the image-side surface of the fourth lens element and the optical axis, and DDsag42 is a second-order derivative of the distance Sag42 with respect to the off-axis height Y. DDsag42 has changed at least once from positive to negative, or vice versa.

For purposes of summarizing, some aspects, advantages and features of some embodiments of the disclosure have been described in this summary. Not necessarily all of (or any of) these summarized aspects, advantages or features will be embodied in any particular embodiment of the disclosure. Some of these summarized aspects, advantages and features and other aspects, advantages and features may become more fully apparent from the following detailed description and the appended claims.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 1C is a schematic diagram of the longitudinal spherical aberration curves based on the wavelengths of 486.1 nm, 587.6 nm and 656.3 nm, of the image capturing lens assembly of FIG. 1A;

FIG. 1D is a schematic diagram of the astigmatic field curves based on the wavelength of 587.6 nm, of the image capturing lens assembly of FIG. 1A;

FIG. 1E is a schematic diagram of the distortion curve based on the wavelength of 587.6 nm, of the image capturing lens assembly of FIG. 1A;

FIG. 4C is a schematic diagram of the longitudinal spherical aberration curves based on the wavelengths of 486.1 nm, 587.6 nm and 656.3 nm, of the image capturing lens assembly of FIG. 4A;

FIG. 4D is a schematic diagram of the astigmatic field curves based on the wavelength of 587.6 nm, of the image capturing lens assembly of FIG. 4A;

FIG. 4E is a schematic diagram of the distortion curve based on the wavelength of 587.6 nm, of the image capturing lens assembly of FIG. 4A;

FIG. 5C is a schematic diagram of the longitudinal spherical aberration curves based on the wavelengths of 486.1 nm, 587.6 nm and 656.3 nm, of the image capturing lens assembly of FIG. 5A;

FIG. 5D is a schematic diagram of the astigmatic field curves based on the wavelength of 587.6 nm, of the image capturing lens assembly of FIG. 5A;

FIG. 5E is a schematic diagram of the distortion curve based on the wavelength of 587.6 nm, of the image capturing lens assembly of FIG. 5A;

FIG. 6C is a schematic diagram of the longitudinal spherical aberration curves based on the wavelengths of 486.1 nm, 587.6 nm and 656.3 nm, of the image capturing lens assembly of FIG. 6A;

FIG. 6D is a schematic diagram of the astigmatic field curves based on the wavelength of 587.6 nm, of the image capturing lens assembly of FIG. 6A;

FIG. 6E is a schematic diagram of the distortion curve based on the wavelength of 587.6 nm, of the image capturing lens assembly of FIG. 6A;

FIG. 7C is a schematic diagram of the longitudinal spherical aberration curves based on the wavelengths of 486.1 nm, 587.6 nm and 656.3 nm, of the image capturing lens assembly of FIG. 7A;

FIG. 7D is a schematic diagram of the astigmatic field curves based on the wavelength of 587.6 nm, of the image capturing lens assembly of FIG. 7A;

FIG. 7E is a schematic diagram of the distortion curve based on the wavelength of 587.6 nm, of the image capturing lens assembly of FIG. 7A;

FIG. 8C is a schematic diagram of the longitudinal spherical aberration curves based on the wavelengths of 486.1 nm, 587.6 nm and 656.3 nm, of the image capturing lens assembly of FIG. 8A;

FIG. 8D is a schematic diagram of the astigmatic field curves based on the wavelength of 587.6 nm, of the image capturing lens assembly of FIG. 8A;

FIG. 8E is a schematic diagram of the distortion curve based on the wavelength of 587.6 nm, of the image capturing lens assembly of FIG. 8A;

FIG. 9C is a schematic diagram of the longitudinal spherical aberration curves based on the wavelengths of 486.1 nm, 587.6 nm and 656.3 nm, of the image capturing lens assembly of FIG. 9A;

FIG. 9D is a schematic diagram of the astigmatic field curves based on the wavelength of 587.6 nm, of the image capturing lens assembly of FIG. 9A; and FIG. 9E is a schematic diagram of the distortion curve based on the wavelength of 587.6 nm, of the image capturing lens assembly of FIG. 9A.

DETAILED DESCRIPTION

Figure 1A:
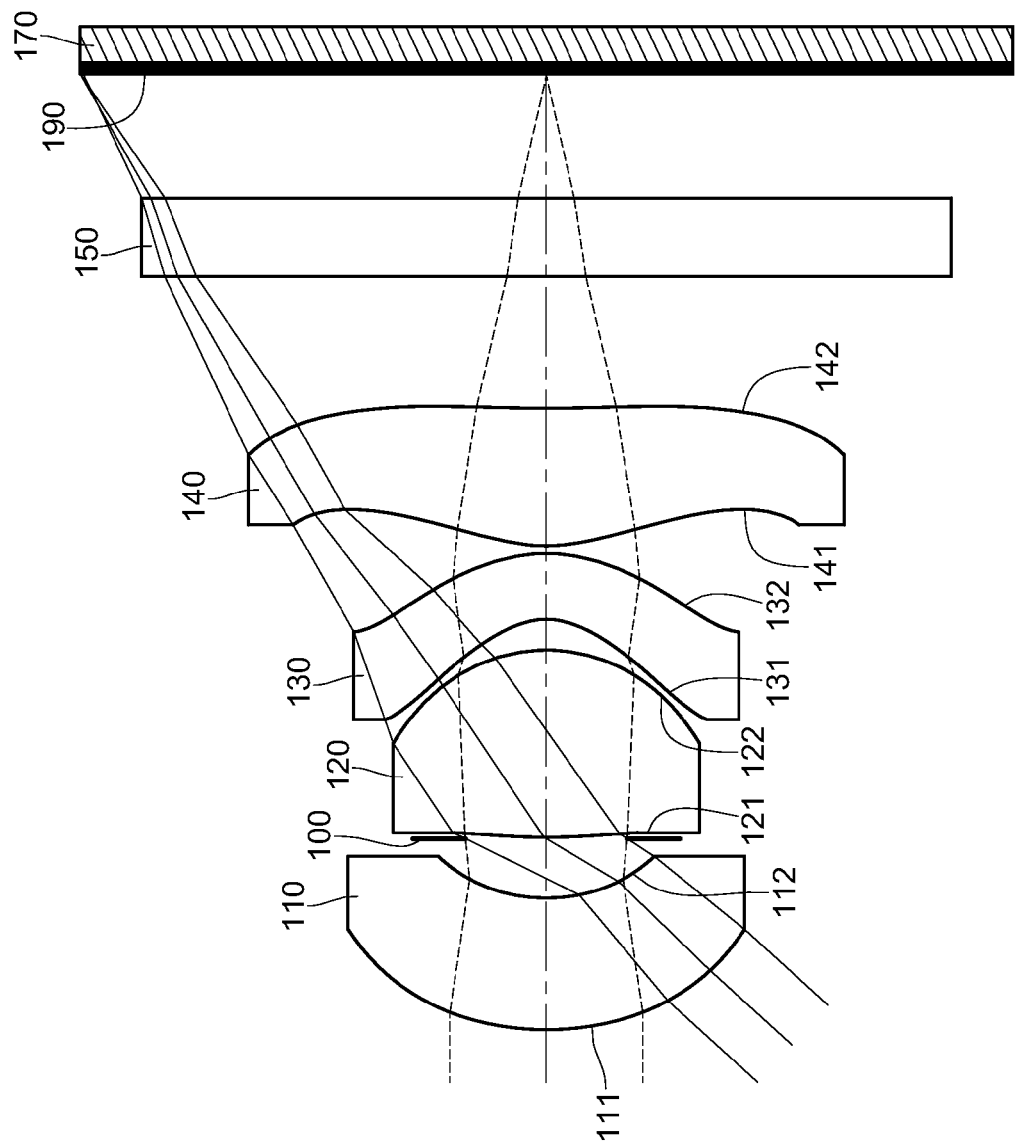
FIG. 1A is a structural schematic diagram of an image capturing lens assembly according to a first embodiment of the disclosure.

The image capturing lens assembly of the disclosure (hereinafter called "the lens assembly") is described to illustrate that the embodiments have similar lens combinations, configuration relationships, and the same conditions of the optical lens assembly. The differences are described in detail in the following embodiments.

The lens assembly comprises, from an object side to an image side along an optical axis in sequence, a first lens element, a second lens element, a third lens element and a fourth lens element.

The first lens element with negative refractive power has an object-side surface at a paraxial region being convex, and an image-side surface being concave at a paraxial region. The negative refractive power of the first lens element is favorable for increasing the field angle of the lens assembly. The shape of the first lens element is favorable for arranging the field angle of the lens assembly and for correcting the astigmatism in the lens assembly.

The second lens element with positive refractive power has an object-side surface being convex at a paraxial region, and an image-side surface being convex at a paraxial region. The positive refractive power of the second lens element is favorable for providing a portion of the positive refractive power of the lens assembly, thereby reducing the total length of the lens assembly.

The third lens element with negative refractive power has an object-side surface being concave at a paraxial region, and an image-side surface being convex at a paraxial region. The negative refractive power of the third lens element is favorable for correcting the aberration caused by the second lens element.

The fourth lens element with positive refractive power has an object-side surface being convex at a paraxial region, and an image-side surface at a paraxial region being concave, and at least one of the object-side and image-side surfaces of the fourth lens element is aspheric. The positive refractive power of the fourth lens element is favorable for arranging the positive refractive power of the second lens element and for reducing the sensitivity of the lens assembly. The shape of the fourth lens element is favorable for correcting the astigmatism in the lens assembly.

T12 is an axial distance between the first lens element and the second lens element, and T23 is an axial distance between the second lens element and the third lens element. When the lens assembly satisfies a following condition: $1.05 < T12/T23 < 2.8$, the distances among the first, second, third and fourth lens elements may be reduced so as to minimize the size of the lens assembly. When the condition of $1.35 < T12/T23 < 2.5$ is satisfied, it is favorable for the aforementioned purpose.

CT1 is a central thickness of the first lens element, and CT3 is a central thickness of the third lens element. When the lens assembly satisfies a following condition: $1.00 < CT1/CT3 < 5.0$, the thickness of the first lens element and of the third lens element may be designed suitably. Thus, the formability and homogeneity of plastic lens element's injection molding is increased, and the lens assembly difficulty caused by lens elements with unsuitable thickness is reduced, whereby the image quality of the lens assembly is increased. When the condition of $1.25 < CT1/CT3 < 4.0$ is satisfied, it is favorable for the aforementioned purpose. When the condition of $1.50 < CT1/CT3 < 3.0$ is satisfied, it is more favorable for the aforementioned purpose.

Td is an axial distance between the object-side surface of the first lens element and the image-side surface of the fourth lens element, and ImgH is a maximum image height of the image sensor. ImgH is a maximum image height of the lens assembly, which is a half diagonal of the effective sensing region of the image sensor. When the lens assembly satisfies a following condition: $1.0 < Td/ImgH < 2.0$, the lens elements of the lens assembly may be assembled more compactly so as to minimize the lens assembly. When the condition of 1.1<Td/ImgH<1.65 is satisfied, it is more favorable for the aforementioned purpose.

Sd is an axial distance between a stop and the image-side surface of the fourth lens element, and Td is the axial distance between the object-side surface of the first lens element and the image-side surface of the fourth lens element. When the lens assembly satisfies a following condition: 0.60<Sd/Td<0.85, the telecentric characteristic and the wide-angle characteristic thereof may be balanced therebetween. Thus, the lens assembly may obtain an enough field angle, and the efficiency of image receiving of the image sensor may be increased.

V1 is an Abbe number of the first lens element, and V3 is an Abbe number of the third lens element. When the lens assembly satisfies a following condition: 30<V1+V3 <65, the chromatic aberration generated by the lens assembly may be corrected.

f is a focal length of the lens assembly, f2 is a focal length of the second lens element, f3 is a focal length of the third lens element, and f4 is a focal length of the fourth lens element. When the lens assembly satisfies a following condition: 3.8<f/f2 +f/f3+f/f4<5.5, the refractive powers among the lens elements of the lens assembly may be arranged well to reduce the sensitivity and the aberration of the lens assembly and to strengthen the telecentric characteristic of the lens assembly. Thus, the back focal length of the lens assembly is reduced, and whereby the total length of the lens assembly is reduced.

T12 is the axial distance between the first lens element and the second lens element, T23 is the axial distance between the second lens element and the third lens element, T34 is an axial distance between the third lens element and the fourth lens element, and Td is the axial distance between the object-side surface of the first lens element and the image-side surface of the fourth lens element. When the lens assembly satisfies a following condition: 0.05<(T12+T23+T34)/Td<0.25, the lens assembly may be assembled well to increase the manufacture quality thereof.

Sag32 is a distance in parallel with the optical axis from a point on the image-side surface of the third lens element to an axial vertex on the image-side surface of the third lens element, and CT3 is the central thickness of the third lens element. When the lens assembly satisfies a following condition: 1.1<|Sag32|/CT3<2.5, the shape of the third lens element may not be flexural too much. Thus, it is favorable for forming the third lens element and for assembling the lens elements more compactly.

R7 is a curvature radius of the object-side surface of the fourth lens element, and R8 is a curvature radius of the image-side surface of the fourth lens element. When the lens assembly satisfies a following condition: −1.8<(R7+R8)/(R7−R8) <−0.7, the aberration generated by the lens assembly may be corrected through the design of curvature radius. When the condition of −1.8<(R7+R8)/(R7−R8)<−1.0 is satisfied, it is favorable for the aforementioned purpose.

Y11 is an effective radius of the object-side surface of the first lens element, and Y42 is an effective radius of the image-side surface of the fourth lens element. When the lens assembly satisfies a following condition: 0.40<|Y11/Y42|<0.85, the angle which the incident light projects onto the image sensor may be effectively limited, whereby the off-axis aberration is corrected.

fx and fy are two of focal lengths out of the second, third, and fourth lens elements, x is equal to 2, 3 or 4, y is equal to 2, 3 or 4, and x≠y. When the lens assembly satisfies a following condition: 0.75<|fx/fy|<1.33, two of the refractive powers of the second lens element to the fourth lens element may be arranged more averagely so as to reduce the sensitivity and the aberration of the lens assembly.

According to the image capturing lens assembly of the present disclosure, each of the object-side surface and the image-side surface of every lens element has a paraxial region and a peripheral region. The paraxial region refers to the region of the surface where light rays travel close to an optical axis and the peripheral region refers to the region of the surface where light rays travel away from the optical axis.

Moreover, a convex surface means the surface at a paraxial region is convex, and a concave surface means the surface at a paraxial region is concave.

According to the image capturing lens assembly of the present disclosure, image capturing lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

For the lens assembly, the specific schemes are further described with the following embodiments. Parameters in the embodiments are defined as follows. The aspheric surface in the embodiments may be represented by, but not limited to, the following aspheric surface equation (Formula ASP):

$$X(Y) = (Y^2/R)/(1 + sqrt(1 - (1+k)*(Y/R)^2)) + \sum_i (Ai)*(Y^i)$$

wherein X is the relative distance between a point on the aspheric surface at a distance Y from the optical axis, and the tangential plane at the aspheric surface vertex, Y is the distance from the point on the curve of the aspheric surface to the optical axis, k is a conic factor, Ai is an $i^{th}$ order aspheric surface coefficient, R is the curvature radius, and in the embodiments, i may be, but is not limited to, 4, 6, 8, 10, 12, 14 and 16.

The First Embodiment (Embodiment 1)

Figure 1B:
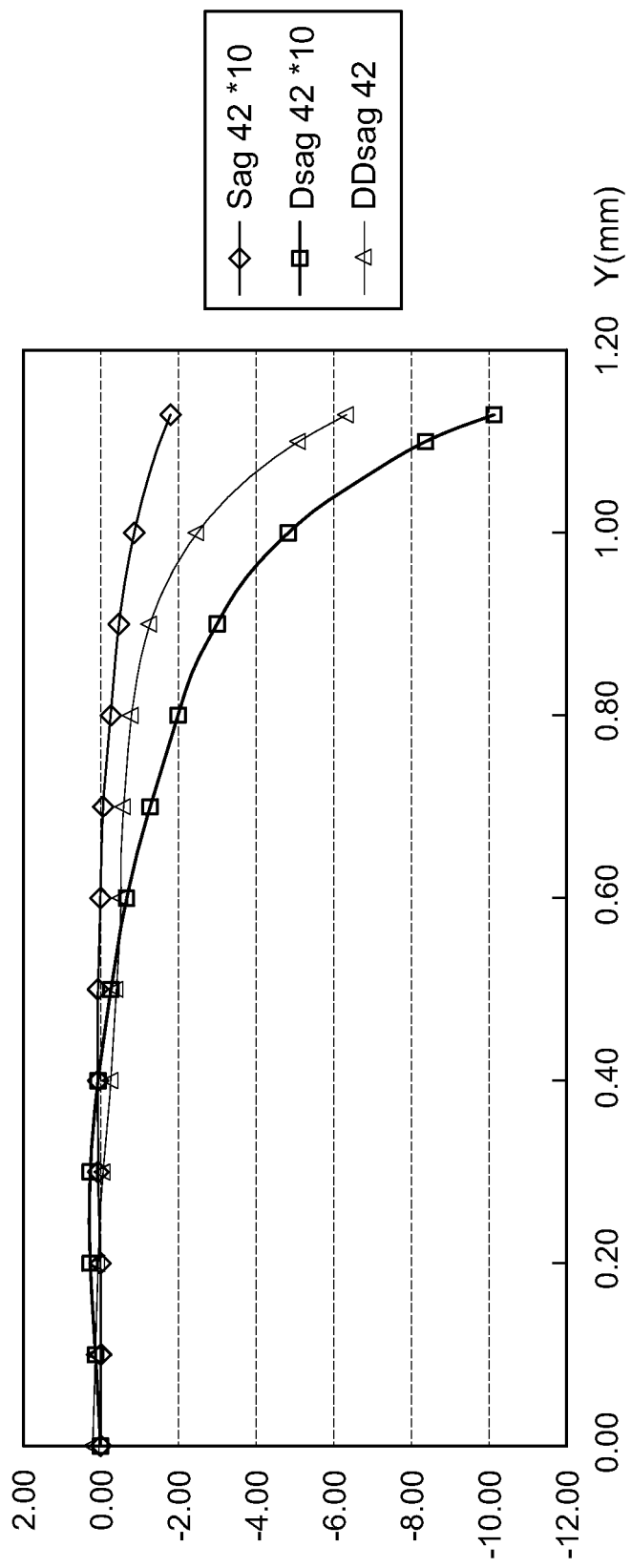
FIG. 1B is a schematic diagram of a horizontal distance curve, a derivative curve and a second-order derivative curve of an image-side surface of the fourth lens element in FIG. 1A.

Referring to FIGS. 1A to 1E, the lens assembly of the first embodiment comprises, from an object side to an image side along an optical axis in sequence (from left to right in FIG. 1A), a first lens element 110, a stop, which here is an aperture stop 100, a second lens element 120, a third lens element 130, a fourth lens element 140, an IR-cut filter (infrared-cut filter) 150 and an image plane 190 disposed at an image sensor 170.

A first lens element 110 made of plastic with negative refractive power has a convex object-side surface 111 and a concave image-side surface 112, and the object-side surface 111 and the image-side surface 112 are aspheric. A second lens element 120 made of plastic with positive refractive power has a convex object-side surface 121 and a convex image-side surface 122, and the object-side surface 121 and the image-side surface 122 are aspheric. A third lens element 130 made of plastic with negative refractive power has a concave object-side surface 131 and a convex image-side surface 132, and the object-side surface 131 and the image-side surface 132 are aspheric. A fourth lens element 140 made of plastic with positive refractive power has a convex object-side surface 141 and a concave image-side surface 142, and the object-side surface 141 and the image-side surface 142 are aspheric.

Sag42 is a distance in parallel with the optical axis from a point on the image-side surface 142 of the fourth lens element 140 to an axial vertex on the image-side surface 142 of the fourth lens element 140, Y is an off-axis height between a point on the image-side surface 142 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 1-1 below:

TABLE 1-1

Embodiment 1
f = 1.61 mm, Fno = 2.20, HFOV = 47.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.077 | ASP | 0.501 | Plastic | 1.634 | 23.8 | −5.38 |
| 2 | | 0.671 | ASP | 0.225 | | | | |
| 3 | Ape. Stop | Plano | | 0.006 | | | | |
| 4 | Lens 2 | 2.658 | ASP | 0.711 | Plastic | 1.544 | 55.9 | 1.00 |
| 5 | | −0.623 | ASP | 0.117 | | | | |
| 6 | Lens 3 | −0.268 | ASP | 0.250 | Plastic | 1.634 | 23.8 | −1.01 |
| 7 | | −0.627 | ASP | 0.030 | | | | |
| 8 | Lens 4 | 0.628 | ASP | 0.523 | Plastic | 1.544 | 55.9 | 1.25 |
| 9 | | 5.999 | ASP | 0.500 | | | | |
| 10 | IR-filter | Plano | | 0.300 | Glass | 1.517 | 64.2 | — |
| 11 | | Plano | | 0.471 | | | | |
| 12 | Image | Plano | | — | | | | |

Note:
Reference wavelength is d-line 587.6 nm

Surface numbers 0-12 represent the surfaces sequentially arranged from the object-side to the image-side along the optical axis. "f" stands for the focal length, "Fno" is the f-number, "HFOV" is a half of maximal field of view of this embodiment, and "ASP" represents aspheric surfaces. The unit for values of curvature radius, thickness, and focal length is in millimeters (mm) hereinafter.

The detailed data of the parameters of the aspheric surfaces are shown in Table 1-2 below:

TABLE 1-2

Aspheric Coefficients

| | Surface # | | | |
|---|---|---|---|---|
| | 1 | 2 | 4 | 5 |
| k = | −7.5726E+00 | 4.3424E−01 | −3.8442E+00 | −1.0381E+00 |
| A4 = | 8.4874E−01 | 2.4433E−01 | −9.9473E−02 | −3.0549E−01 |
| A6 = | −1.2143E+00 | 1.5640E+00 | −1.0976E+00 | −9.5660E−01 |
| A8 = | 2.2627E+00 | 7.4184E+00 | −9.1732E+00 | −3.4625E+00 |
| A10 = | −1.3009E+00 | −8.8510E+01 | 2.2519E+01 | 7.2677E+00 |

| | Surface # | | | |
|---|---|---|---|---|
| | 6 | 7 | 8 | 9 |
| k = | −2.3587E+00 | −7.2075E−01 | −8.3039E+00 | 1.0000E+00 |
| A4 = | −1.0130E+00 | 4.9129E−01 | −2.1133E−01 | −2.6466E−01 |
| A6 = | 9.3720E−01 | −6.4154E−01 | −7.5845E−02 | 1.3751E−01 |
| A8 = | 2.9217E+00 | 1.8828E+00 | 2.7716E−01 | −1.0070E−02 |
| A10 = | 9.2373E+00 | −3.9703E−01 | −2.4232E−01 | −3.3634E−02 |
| A12 = | −1.8398E+01 | | | |

A1 to A16 represent the aspheric coefficients ranging from the $1^{st}$ order to the $16^{th}$ order. All labels for tables of the remaining embodiments share the same definitions as those in Table 1-1 and Table 1-2 of the first embodiment, and their definitions will not be stated again.

The detailed relation among the off-axis height Y, the distance Sag42, the derivative Dsag42 and the second-order derivative DDsag42 are shown in Table 1-3 below:

TABLE 1-3

| Y (mm) | Sag42 * 10 | Dsag42 * 10 | DDsag42 |
|---|---|---|---|
| 0.00 | 0.000 | 0.000 | 0.167 |
| 0.10 | 0.008 | 0.156 | 0.136 |
| 0.20 | 0.029 | 0.252 | 0.047 |
| 0.30 | 0.055 | 0.235 | −0.085 |
| 0.40 | 0.071 | 0.075 | −0.238 |
| 0.50 | 0.064 | −0.239 | −0.387 |

TABLE 1-3-continued

| Y (mm) | Sag42 * 10 | Dsag42 * 10 | DDsag42 |
|---|---|---|---|
| 0.60 | 0.019 | −0.691 | −0.514 |
| 0.70 | −0.078 | −1.263 | −0.633 |
| 0.80 | −0.238 | −1.979 | −0.823 |
| 0.90 | −0.483 | −2.999 | −1.290 |
| 1.00 | −0.863 | −4.789 | −2.460 |
| 1.10 | −1.501 | −8.404 | −5.106 |
| 1.13 | −1.778 | −10.118 | −6.364 |

Note:
the maximum value of Y42 is 1.13 mm

The content of Table 1-4 may be deduced from Table 1-1:

TABLE 1-4

| Embodiment 1 | | | |
|---|---|---|---|
| f (mm) | 1.61 | f/f2 + |f/f3| + f/f4 | 4.49 |
| Fno | 2.20 | |Sag32|/CT3 | 1.19 |
| HFOV (deg.) | 47.7 | |Y11/Y42| | 0.67 |
| V1 + V3 | 47.6 | (T12 + T23 + T34)/Td | 0.16 |
| CT1/CT3 | 2.004 | Sd/Td | 0.69 |
| T12/T23 | 1.974 | Td/ImgH | 1.33 |
| (R7 + R8)/(R7 − R8) | −1.23 | — | — |

The Second Embodiment (Embodiment 2)

Figure 2A:
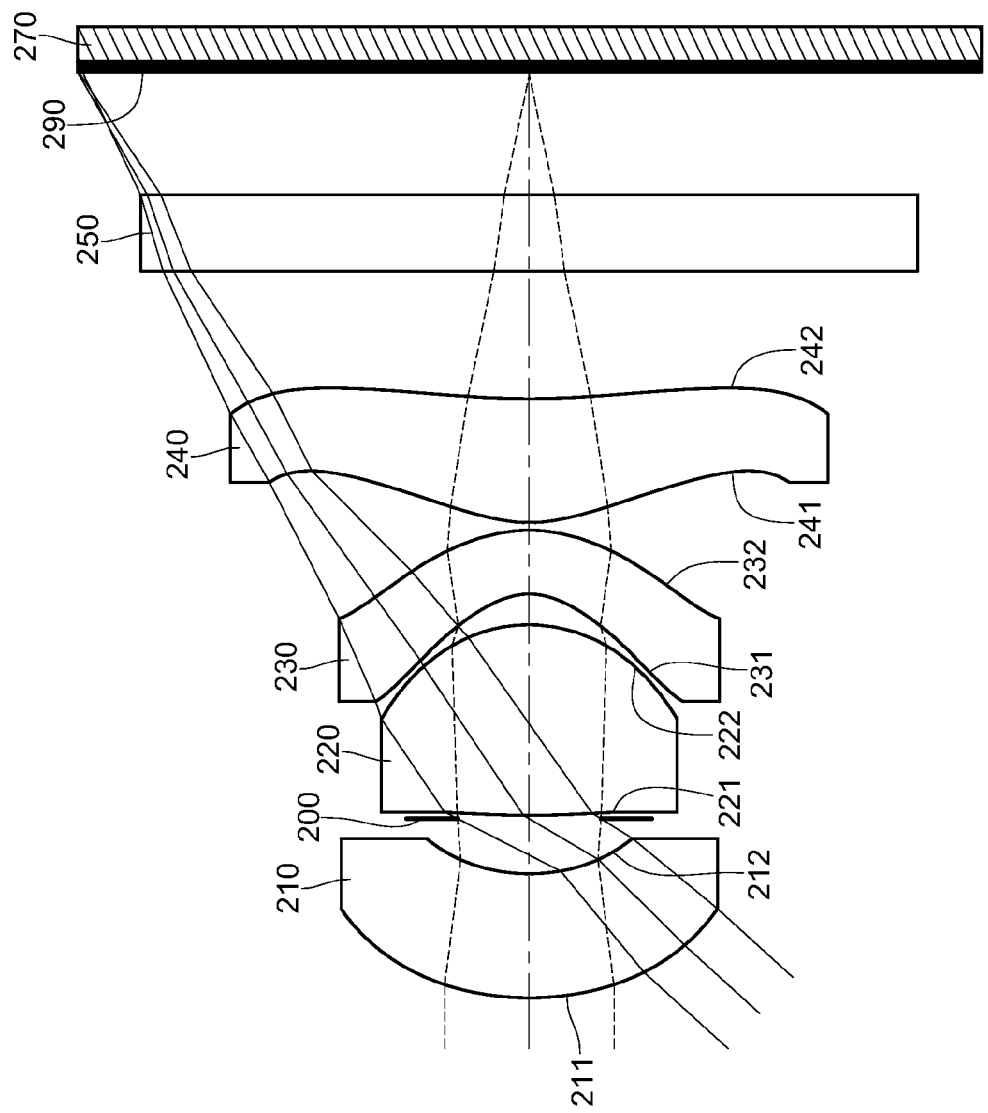
FIG. 2A is a structural schematic diagram of an image capturing lens assembly according to a second embodiment of the disclosure.
Figure 2B:
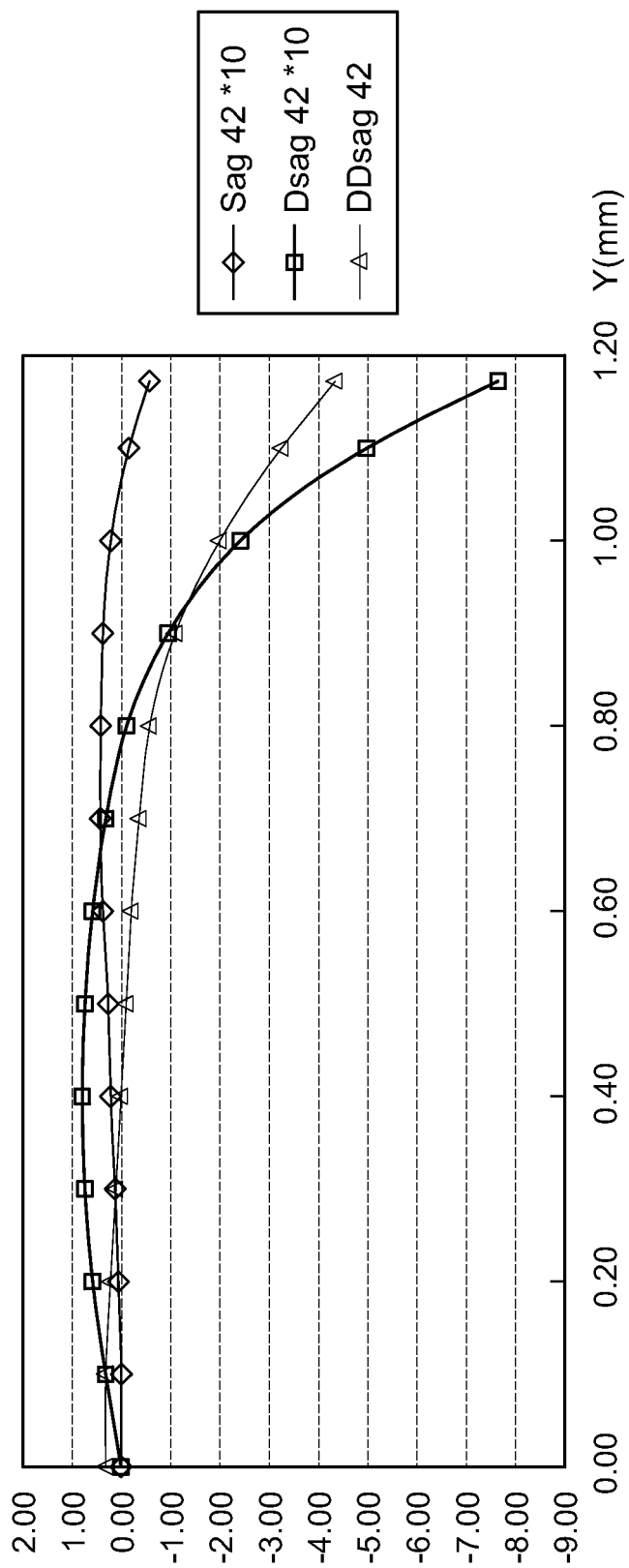
FIG. 2B is a schematic diagram of a horizontal distance curve, a derivative curve and a second-order derivative curve of an image-side surface of the fourth lens element in FIG. 2A.
Figure 2E:
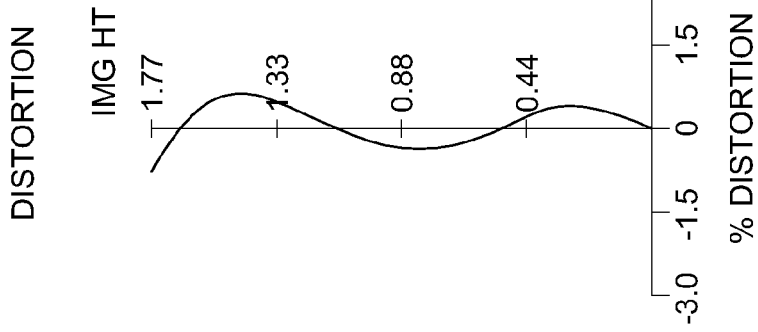
FIG. 2E is a schematic diagram of the distortion curve based on the wavelength of 587.6 nm, of the image capturing lens assembly of FIG. 2A.
Figure 2D:
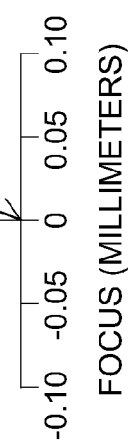
FIG. 2D is a schematic diagram of the astigmatic field curves based on the wavelength of 587.6 nm, of the image capturing lens assembly of FIG. 2A.
Figure 2C:
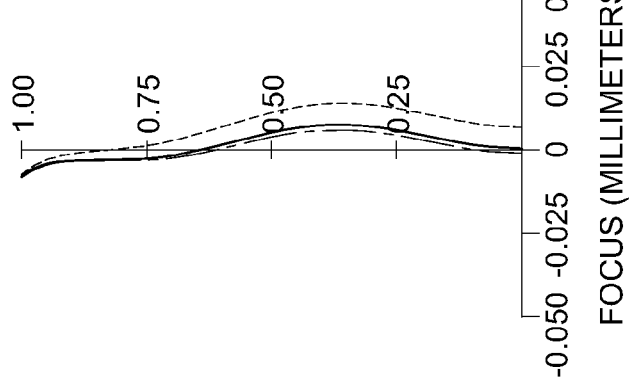
FIG. 2C is a schematic diagram of the longitudinal spherical aberration curves based on the wavelengths of 486.1 nm, 587.6 nm and 656.3 nm, of the image capturing lens assembly of FIG. 2A.

Referring to FIGS. 2A to 2E, the lens assembly of the second embodiment comprises, from an object side to an image side along an optical axis in sequence (from left to right in FIG. 2A), a first lens element 210, a stop, which here is an aperture stop 200, a second lens element 220, a third lens element 230, a fourth lens element 240, an IR-cut filter 250 and an image plane 290 disposed at an image sensor 270.

A first lens element 210 made of plastic with negative refractive power has a convex object-side surface 211 and a concave image-side surface 212, and the object-side surface 211 and the image-side surface 212 are aspheric. A second lens element 220 made of plastic with positive refractive power has a convex object-side surface 221 and a convex image-side surface 222, and the object-side surface 211 and the image-side surface 222 are aspheric. A third lens element 230 made of plastic with negative refractive power has a concave object-side surface 231 and a convex image-side surface 232, and the object-side surface 231 and the image-side surfaces 232 are aspheric. A fourth lens element 240 made of plastic with positive refractive power has a convex object-side surface 241 and a concave image-side surface 242, and the object-side surface 241 and the image-side surface 242 are aspheric.

Sag42 is a distance in parallel with the optical axis from a point on the image-side surface 242 of the fourth lens element 240 to an axial vertex on the image-side surface 242 of the fourth lens element 240, Y is an off-axis height between a point on the image-side surface 242 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 2-1 below:

TABLE 2-1

Embodiment 2
f = 1.62 mm, Fno = 2.45, HFOV = 47.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.121 | ASP | 0.487 | Plastic | 1.634 | 23.8 | −6.33 |
| 2 | | 0.729 | ASP | 0.215 | | | | |
| 3 | Ape. Stop | Plano | | 0.014 | | | | |
| 4 | Lens 2 | 3.397 | ASP | 0.748 | Plastic | 1.544 | 55.9 | 0.98 |
| 5 | | −0.586 | ASP | 0.121 | | | | |
| 6 | Lens 3 | −0.253 | ASP | 0.250 | Plastic | 1.634 | 23.8 | −0.93 |
| 7 | | −0.613 | ASP | 0.030 | | | | |
| 8 | Lens 4 | 0.564 | ASP | 0.486 | Plastic | 1.535 | 56.3 | 1.22 |
| 9 | | 2.999 | ASP | 0.500 | | | | |
| 10 | IR-filter | Plano | | 0.300 | Glass | 1.517 | 64.2 | — |
| 11 | | Plano | | 0.481 | | | | |
| 12 | Image | Plano | | — | | | | |

Note:
Reference wavelength is d-line 587.6 nm

The detailed data of the parameters of the aspheric surfaces are shown in Table 2-2 below:

TABLE 2-2

| Aspheric Coefficients | | | | |
|---|---|---|---|---|
| | Surface # | | | |
| | 1 | 2 | 4 | 5 |
| k = | −5.1505E+00 | 1.6681E−01 | −5.8623E+00 | −9.7420E−01 |
| A4 = | 5.8263E−01 | 3.6932E−01 | −2.6658E−01 | −2.1243E−01 |
| A6 = | −4.1398E−01 | 2.4959E+00 | 2.2883E−01 | −2.5712E+00 |
| A8 = | 9.0978E−01 | −5.5026E+00 | −5.1997E+01 | 3.1880E+00 |
| A10 = | −3.7791E−01 | −2.5938E+01 | 2.2085E+02 | |

TABLE 2-2-continued

Aspheric Coefficients

| | Surface # | | | |
|---|---|---|---|---|
| | 6 | 7 | 8 | 9 |
| k = | −2.3266E+00 | −7.3955E−01 | −6.6385E+00 | −5.1025E+00 |
| A4 = | −1.4031E+00 | 4.8189E−01 | −1.3657E−01 | −2.3882E−01 |
| A6 = | 1.2164E+00 | −7.3078E−01 | 4.4551E−02 | 2.4987E−01 |
| A8 = | 1.0675E+00 | 1.6612E+00 | −9.7021E−03 | −1.7351E−01 |
| A10 = | 1.9987E+01 | −3.8305E−01 | −6.0851E−02 | 3.2670E−02 |
| A12 = | −3.2453E+01 | | | |

The detailed relation among the off-axis height Y, the distance Sag42, the derivative Dsag42 and the second-order derivative DDsag42 are shown in Table 2-3 below:

TABLE 2-3

| Y (mm) | Sag42 * 10 | Dsag42 * 10 | DDsag42 |
|---|---|---|---|
| 0.00 | 0.000 | 0.000 | 0.334 |
| 0.10 | 0.016 | 0.323 | 0.303 |
| 0.20 | 0.063 | 0.589 | 0.221 |
| 0.30 | 0.131 | 0.756 | 0.110 |
| 0.40 | 0.210 | 0.808 | −0.005 |
| 0.50 | 0.289 | 0.752 | −0.105 |
| 0.60 | 0.357 | 0.601 | −0.199 |
| 0.70 | 0.406 | 0.342 | −0.332 |
| 0.80 | 0.420 | −0.104 | −0.591 |
| 0.90 | 0.373 | −0.920 | −1.093 |
| 1.00 | 0.213 | −2.411 | −1.956 |
| 1.10 | −0.145 | −4.972 | −3.231 |
| 1.17 | −0.589 | −7.651 | −4.331 |

Note:
the maximum value of Y42 is 1.17 mm

The content of Table 2-4 may be deduced from Table 2-1:

TABLE 2-4

| Embodiment 2 | | | |
|---|---|---|---|
| f (mm) | 1.62 | f/f2 + |f/f3| + f/f4 | 4.73 |
| Fno | 2.45 | |Sag32|/CT3 | 1.39 |
| HFOV (deg.) | 47.7 | |Y11/Y42| | 0.63 |
| V1 + V3 | 47.6 | (T12 + T23 + T34)/Td | 0.16 |
| CT1/CT3 | 1.948 | Sd/Td | 0.70 |
| T12/T23 | 1.893 | Td/ImgH | 1.33 |
| (R7 + R8)/(R7 − R8) | −1.46 | — | — |

The Third Embodiment (Embodiment 3)

Figure 3A:
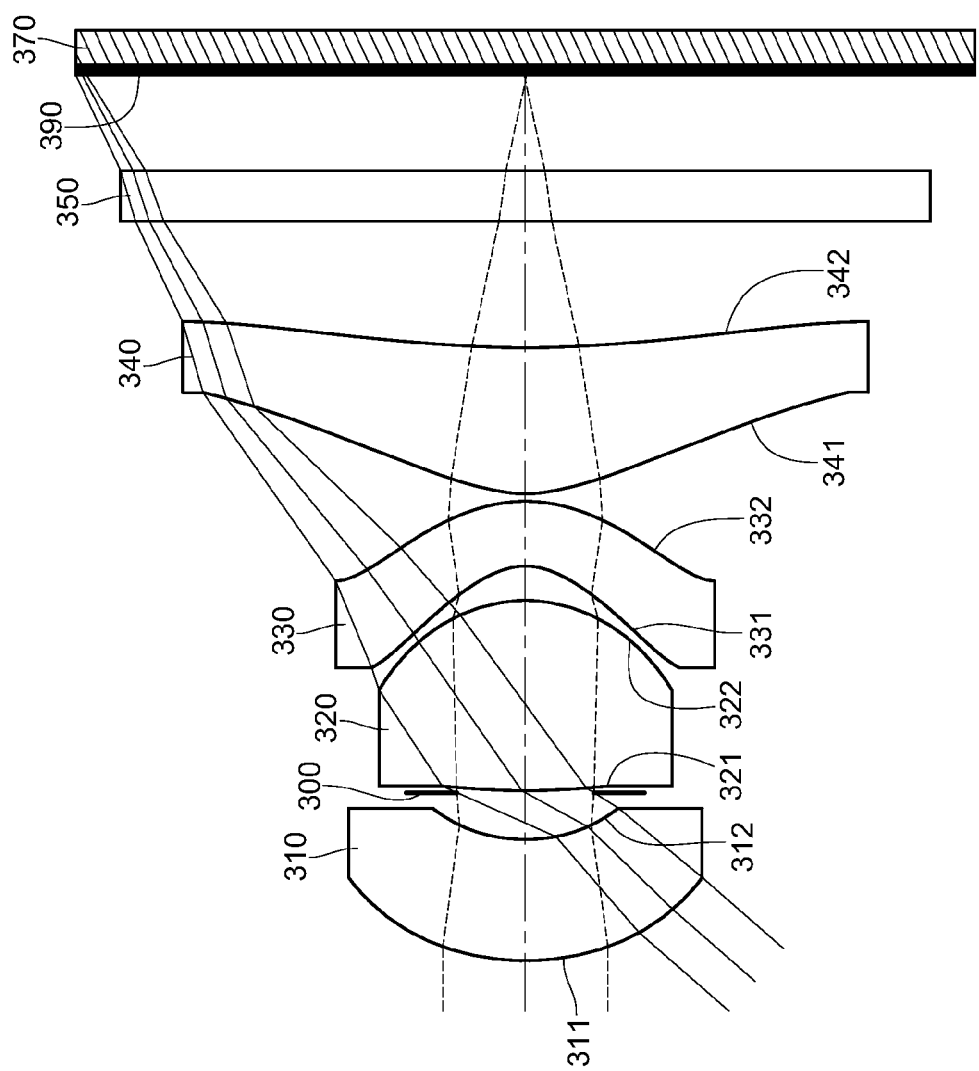
FIG. 3A is a structural schematic diagram of an image capturing lens assembly according to a third embodiment of the disclosure.
Figure 3B:
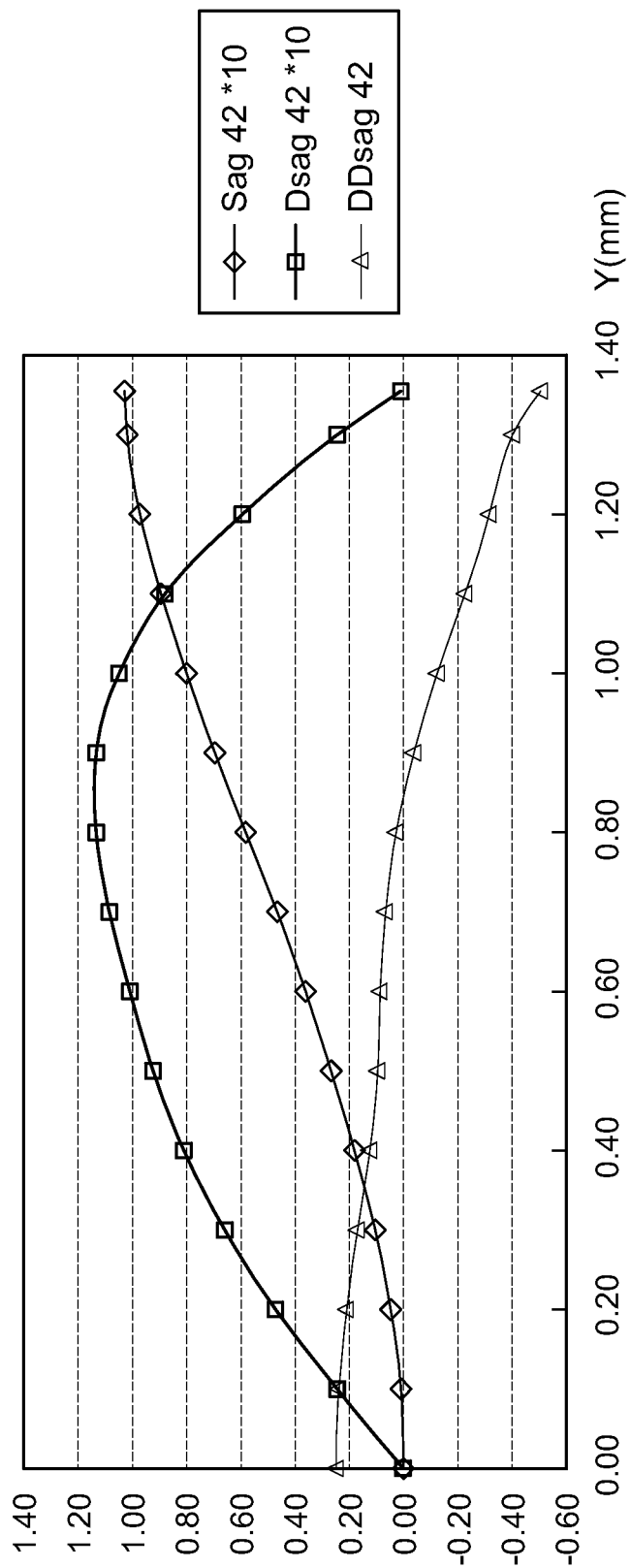
FIG. 3B is a schematic diagram of a horizontal distance curve, a derivative curve and a second-order derivative curve of an image-side surface of the fourth lens element in FIG. 3A.
Figures 3C, 3D, 3E:
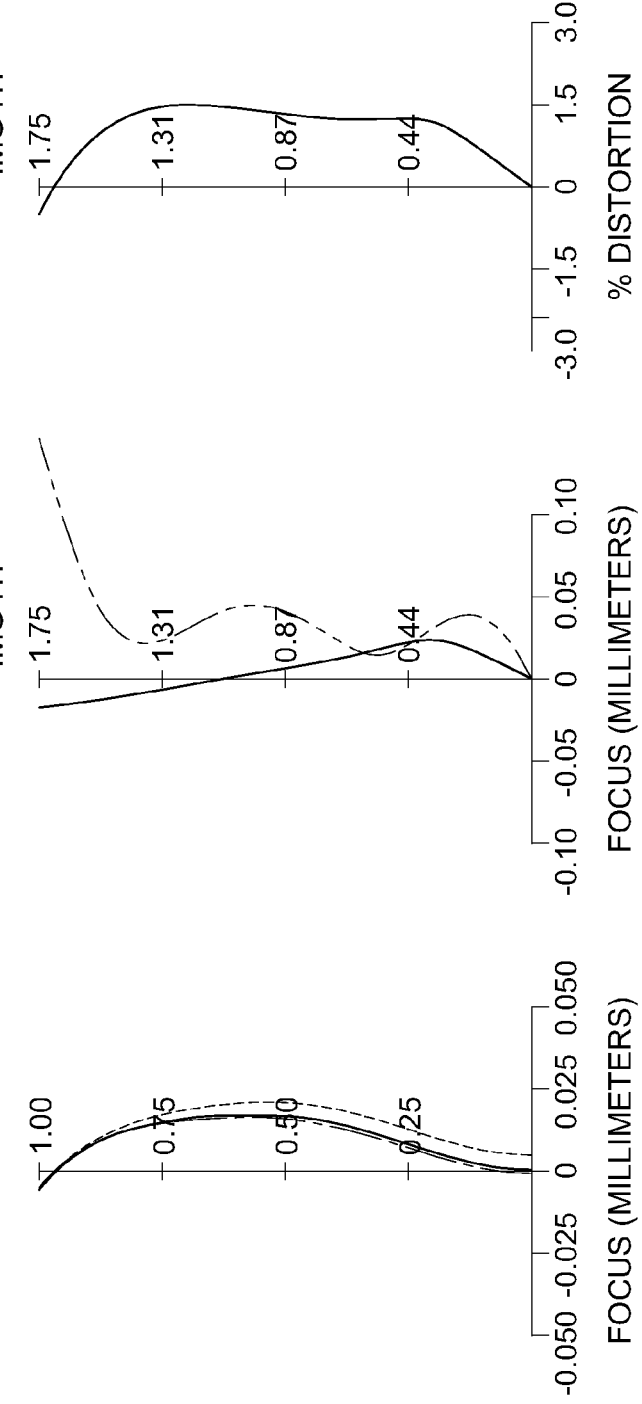
FIG. 3C is a schematic diagram of the longitudinal spherical aberration curves based on the wavelengths of 486.1 nm, 587.6 nm and 656.3 nm, of the image capturing lens assembly of FIG. 3A.
FIG. 3D is a schematic diagram of the astigmatic field curves based on the wavelength of 587.6 nm, of the image capturing lens assembly of FIG. 3A.
FIG. 3E is a schematic diagram of the distortion curve based on the wavelength of 587.6 nm, of the image capturing lens assembly of FIG. 3A.

Referring to FIGS. 3A to 3E, the lens assembly of the third embodiment comprises, from an object side to an image side along an optical axis in sequence (from left to right in FIG. 3A), a first lens element 310, a stop, which here is an aperture stop 300, a second lens element 320, a third lens element 330, a fourth lens element 340, an IR-cut filter 350 and an image plane 390 disposed at an image sensor 370.

A first lens element 310 made of plastic with negative refractive power has a convex object-side surface 311 and a concave image-side surface 312, and the object-side surface 311 and the image-side surface 312 are aspheric. A second lens element 320 made of plastic with positive refractive power has a convex object-side surface 321 and a convex image-side surface 322, and the object-side surface 321 and the image-side surface 322 are aspheric. A third lens element 330 made of plastic with negative refractive power has a concave object-side surface 331 and a convex image-side surface 332, and the object-side surface 331 and the image-side surface 332 are aspheric. A fourth lens element 340 made of plastic with positive refractive power has a convex object-side surface 341 and a concave image-side surface 342, and the object-side surface 341 and the image-side surface 342 are aspheric.

Sag42 is a distance in parallel with the optical axis from a point on the image-side surface 342 of the fourth lens element 340 to an axial vertex on the image-side surface 342 of the fourth lens element 340, Y is an off-axis height between a point on the image-side surface 342 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 3-1 below:

TABLE 3-1

Embodiment 3
f = 1.53 mm, Fno = 2.35, HFOV = 48.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.029 | ASP | 0.479 | Plastic | 1.640 | 23.3 | −5.66 |
| 2 | | 0.656 | ASP | 0.185 | | | | |
| 3 | Ape. Stop | Plano | | 0.008 | | | | |
| 4 | Lens 2 | 2.562 | ASP | 0.752 | Plastic | 1.535 | 56.3 | 0.97 |
| 5 | | −0.584 | ASP | 0.136 | | | | |
| 6 | Lens 3 | −0.250 | ASP | 0.256 | Plastic | 1.640 | 23.3 | −0.92 |
| 7 | | −0.604 | ASP | 0.030 | | | | |
| 8 | Lens 4 | 0.554 | ASP | 0.578 | Plastic | 1.535 | 56.3 | 1.14 |
| 9 | | 3.966 | ASP | 0.500 | | | | |
| 10 | IR-filter | Plano | | 0.200 | Glass | 1.517 | 64.2 | |

TABLE 3-1-continued

Embodiment 3
f = 1.53 mm, Fno = 2.35, HFOV = 48.8 deg.

| Surface # | | Curvature Radius | Thickness | Material | Index | Abbe # | Focal Length |
|---|---|---|---|---|---|---|---|
| 11 | | Plano | 0.376 | | | | |
| 12 | Image | Plano | — | | | | |

Note:
Reference wavelength is d-line 587.6 nm

The detailed data of the parameters of the aspheric surfaces are shown in Table 3-2 below:

TABLE 3-2

| Aspheric Coefficients | | | | |
|---|---|---|---|---|
| Surface # | | | | |
| | 1 | 2 | 4 | 5 |
| k = | −4.3988E+00 | 1.3190E+00 | −8.9709E+00 | −1.1240E+00 |
| A4 = | 6.5459E−01 | −4.8149E−02 | −7.3163E−02 | −2.3888E−02 |
| A6 = | −5.3896E−01 | −6.9504E−01 | 7.3836E−02 | −2.1010E+00 |
| A8 = | 1.3444E+00 | 3.1978E+00 | −2.3631E+01 | −2.3651E+00 |
| A10 = | −8.8149E−01 | −2.0336E+02 | 1.1092E+02 | 8.4135E+00 |
| A12 = | 4.9308E−02 | −7.5963E−11 | −9.0927E−11 | 5.6142E−11 |

| Surface # | | | | |
|---|---|---|---|---|
| | 6 | 7 | 8 | 9 |
| k = | −2.2312E+00 | −7.8426E−01 | −6.2892E+00 | 1.9435E+00 |
| A4 = | −1.0696E+00 | 4.1518E−01 | −2.9488E−02 | −1.0873E−01 |
| A6 = | 2.0363E+00 | −5.2067E−01 | 3.8890E−02 | 1.1917E−01 |
| A8 = | −8.5782E−01 | 2.2661E+00 | −5.0471E−02 | −9.1607E−02 |
| A10 = | 1.3002E+01 | −1.2333E+00 | 2.5330E−02 | 3.3587E−02 |
| A12 = | −2.0148E+01 | 1.1994E−02 | −4.5037E−03 | −4.8071E−03 |

The detailed relation among the off-axis height Y, the distance Sag42, the derivative Dsag42 and the second-order derivative DDsag42 are shown in Table 3-3 below:

TABLE 3-3

Embodiment 3

| Y (mm) | Sag42 * 10 | Dsag42 * 10 | DDsag42 |
|---|---|---|---|
| 0.00 | 0.000 | 0.000 | 0.252 |
| 0.10 | 0.013 | 0.248 | 0.240 |
| 0.20 | 0.049 | 0.474 | 0.208 |
| 0.30 | 0.106 | 0.661 | 0.167 |
| 0.40 | 0.180 | 0.808 | 0.128 |
| 0.50 | 0.266 | 0.920 | 0.099 |
| 0.60 | 0.363 | 1.010 | 0.081 |
| 0.70 | 0.468 | 1.083 | 0.063 |
| 0.80 | 0.579 | 1.131 | 0.029 |
| 0.90 | 0.692 | 1.131 | −0.035 |
| 1.00 | 0.802 | 1.051 | −0.127 |
| 1.10 | 0.899 | 0.873 | −0.228 |
| 1.20 | 0.974 | 0.602 | −0.311 |
| 1.30 | 1.017 | 0.251 | −0.399 |
| 1.35 | 1.025 | 0.011 | −0.506 |

Note:
the maximum value of Y42 is 1.35 mm

The content of Table 3-4 may be deduced from Table 3-1:

TABLE 3-4

| Embodiment 3 | | | |
|---|---|---|---|
| f (mm) | 1.53 | f/f2 + |f/f3| + f/f4 | 4.59 |
| Fno | 2.35 | |Sag32|/CT3 | 1.23 |
| HFOV (deg.) | 48.8 | |Y11/Y42| | 0.52 |
| V1 + V3 | 46.6 | (T12 + T23 + T34)/Td | 0.15 |
| CT1/CT3 | 1.871 | Sd/Td | 0.73 |
| T12/T23 | 1.419 | Td/ImgH | 1.39 |
| (R7 + R8)/(R7 − R8) | −1.32 | — | — |

The Fourth Embodiment (Embodiment 4)

Figure 4A:
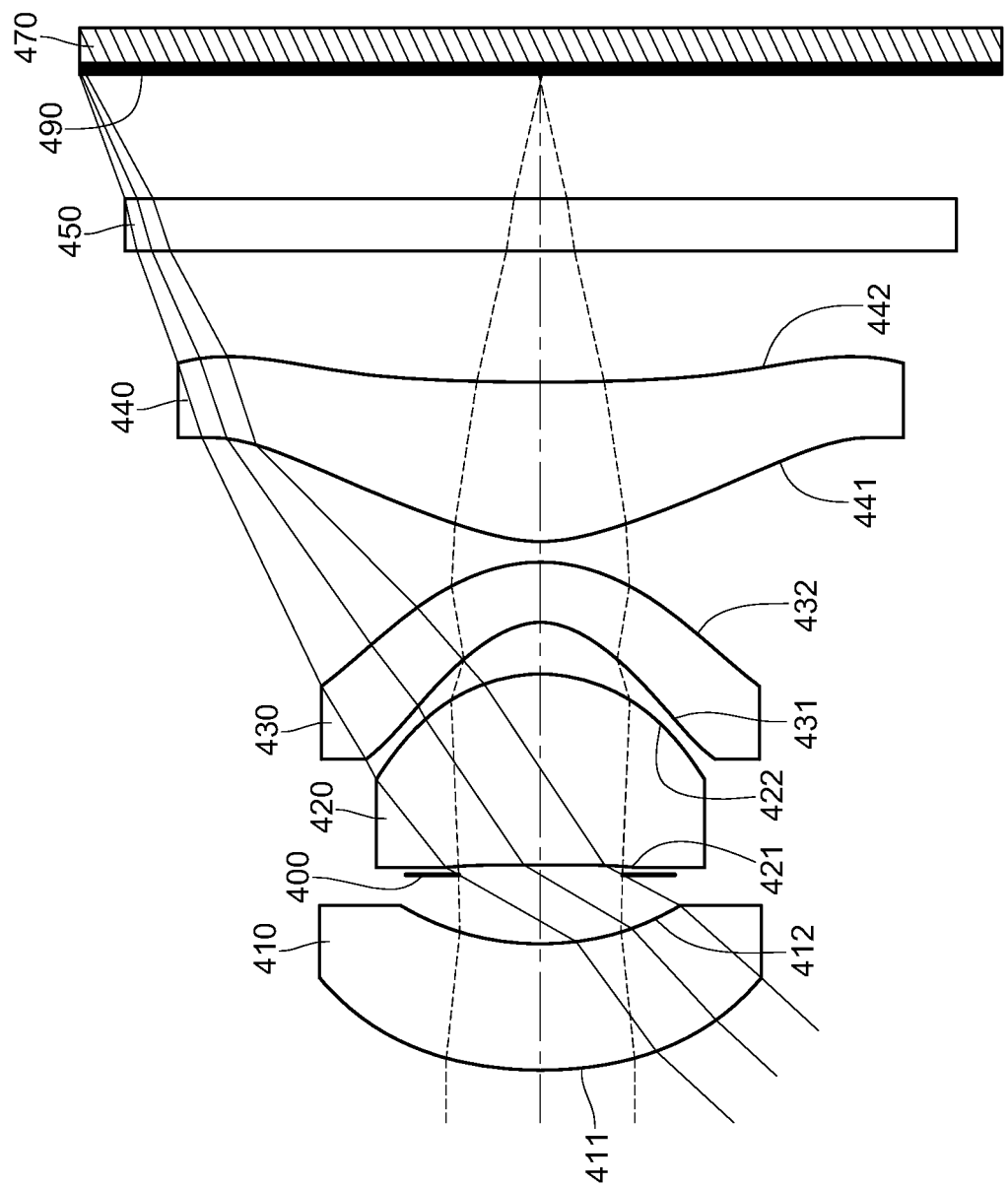
FIG. 4A is a structural schematic diagram of an image capturing lens assembly according to a fourth embodiment of the disclosure.
Figure 4B:
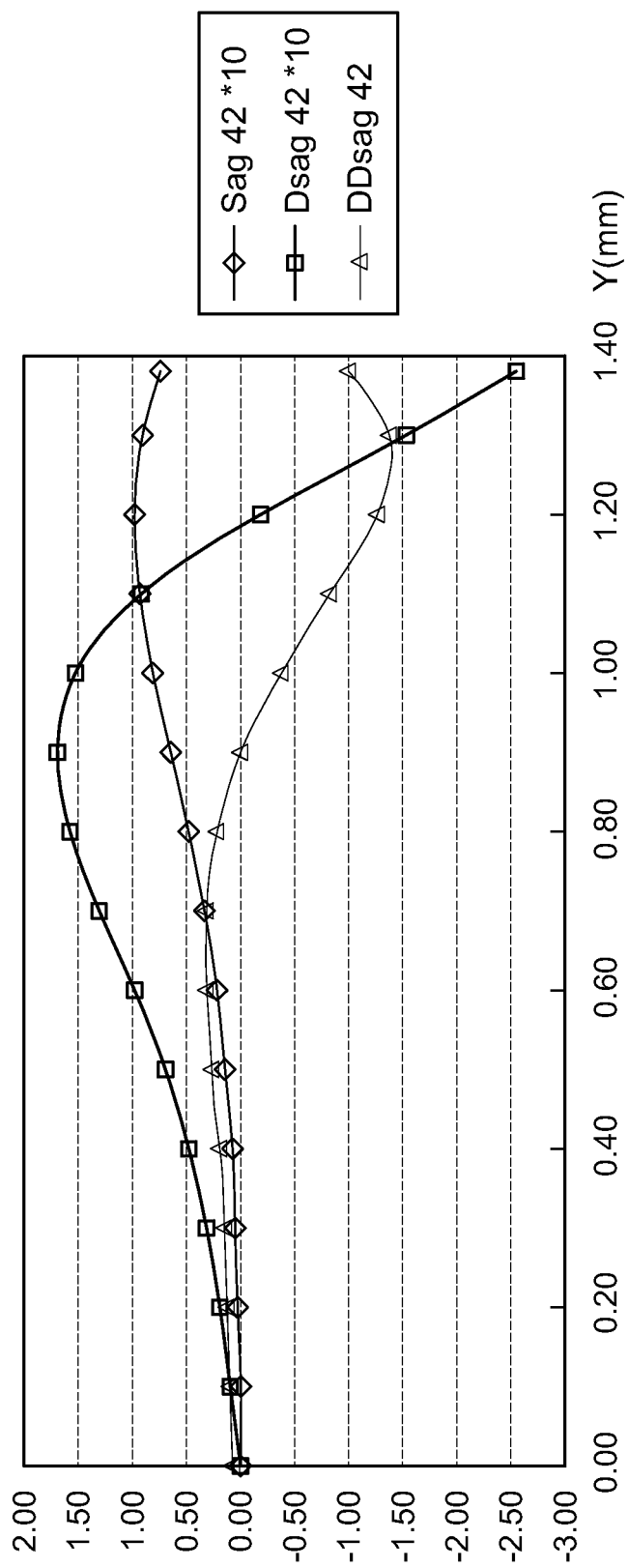
FIG. 4B is a schematic diagram of a horizontal distance curve, a derivative curve and a second-order derivative curve of an image-side surface of the fourth lens element in FIG. 4A.

Referring to FIGS. 4A to 4E, the lens assembly of the fourth embodiment comprises, from an object side to an image side along an optical axis in sequence (from left to right in FIG. 4A), a first lens element 410, a stop, which here is an aperture stop 400, a second lens element 420, a third lens element 430, a fourth lens element 440, an IR-cut filter 450 and an image plane 490 disposed at an image sensor 470.

A first lens element 410 made of plastic with negative refractive power has a convex object-side surface 411 and a concave image-side surface 412, and the object-side surface 411 and the image-side surface 412 are aspheric. A second lens element 420 made of plastic with positive refractive power has a concave object-side surface 421 and a convex image-side surface 422, and the object-side surface 421 and the image-side surface 422 are aspheric. A third lens element 430 made of plastic with negative refractive power has a concave object-side surface 431 and a convex image-side surface 432, and the object-side surface 431 and the image-side surface 432 are aspheric. A fourth lens element 440 made of plastic with positive refractive power has a convex object-side surface 441 and a concave image-side surface 442, and the object-side surface 441 and the image-side surface 442 are aspheric.

Sag42 is a distance in parallel with the optical axis from a point on the image-side surface 442 of the fourth lens element 440 to an axial vertex on the image-side surface 442 of the fourth lens element 440, Y is an off-axis height between a point on the image-side surface 442 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 4-1 below:

TABLE 4-1

Embodiment 4
f = 1.61 mm, Fno = 2.25, HFOV = 47.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.481 | ASP | 0.483 | Plastic | 1.640 | 23.3 | −25.79 |
| 2 | | 1.186 | ASP | 0.263 | | | | |
| 3 | Ape. Stop | Plano | | 0.038 | | | | |
| 4 | Lens 2 | −74.239 | ASP | 0.728 | Plastic | 1.544 | 55.9 | 1.13 |
| 5 | | −0.612 | ASP | 0.197 | | | | |
| 6 | Lens 3 | −0.256 | ASP | 0.230 | Plastic | 1.640 | 23.3 | −0.91 |
| 7 | | −0.618 | ASP | 0.079 | | | | |
| 8 | Lens 4 | 0.606 | ASP | 0.608 | Plastic | 1.544 | 55.9 | 1.15 |
| 9 | | 12.014 | ASP | 0.500 | | | | |
| 10 | IR-filter | Plano | | 0.200 | Glass | 1.517 | 64.2 | — |
| 11 | | Plano | | 0.474 | | | | |
| 12 | Image | Plano | | — | | | | |

Note:
Reference wavelength is d-line 587.6 nm

The detailed data of the parameters of the aspheric surfaces are shown in Table 4-2 below:

TABLE 4-2

Aspheric Coefficients

| | Surface # | | | |
|---|---|---|---|---|
| | 1 | 2 | 4 | 5 |
| k = | −1.2530E+01 | 2.4890E+00 | −2.0000E+01 | −8.8843E−01 |
| A4 = | 5.7705E−01 | 2.1719E−01 | −4.8705E−01 | −1.4936E−01 |
| A6 = | −6.6306E−01 | −7.0380E−01 | 2.5225E+00 | −8.2120E−01 |
| A8 = | 9.1776E−01 | 4.7990E−01 | −5.1094E+01 | −2.2187E+00 |
| A10 = | −5.0045E−01 | −7.9245E+00 | 1.9606E+02 | 5.5755E+00 |
| A12 = | 4.9308E−02 | −7.5495E−11 | −9.1537E−11 | 3.4287E−10 |

| | Surface # | | | |
|---|---|---|---|---|
| | 6 | 7 | 8 | 9 |
| k = | −2.0427E+00 | −7.2439E−01 | −6.4960E+00 | 3.0000E+00 |
| A4 = | −1.4035E+00 | 3.5580E−01 | 1.7532E−02 | 4.5691E−02 |
| A6 = | 1.8061E+00 | −7.8243E−01 | 3.8496E−02 | 5.6942E−02 |
| A8 = | −9.5490E−01 | 2.0633E+00 | −6.2240E−02 | −9.1327E−02 |
| A10 = | 1.2733E+01 | −1.2747E+00 | 1.6698E−02 | 3.0830E−02 |
| A12 = | −1.7705E+01 | 1.1994E−02 | −8.2144E−04 | −2.8765E−03 |

The detailed relation among the off-axis height Y, the distance Sag42, the derivative Dsag42 and the second-order derivative DDsag42 are shown in Table 4-3 below:

TABLE 4-3

Embodiment 4

| Y (mm) | Sag42 * 10 | Dsag42 * 10 | DDsag42 |
|---|---|---|---|
| 0.00 | 0.000 | 0.000 | 0.083 |
| 0.10 | 0.004 | 0.085 | 0.089 |
| 0.20 | 0.017 | 0.182 | 0.108 |
| 0.30 | 0.042 | 0.306 | 0.143 |
| 0.40 | 0.080 | 0.474 | 0.196 |
| 0.50 | 0.138 | 0.702 | 0.259 |
| 0.60 | 0.222 | 0.988 | 0.309 |
| 0.70 | 0.337 | 1.304 | 0.311 |
| 0.80 | 0.482 | 1.579 | 0.220 |
| 0.90 | 0.648 | 1.699 | −0.005 |
| 1.00 | 0.812 | 1.520 | −0.376 |
| 1.10 | 0.937 | 0.914 | −0.845 |

TABLE 4-3-continued

| | Embodiment 4 | | |
|---|---|---|---|
| Y (mm) | Sag42 * 10 | Dsag42 * 10 | DDsag42 |
| 1.20 | 0.979 | −0.157 | −1.271 |
| 1.30 | 0.896 | −1.528 | −1.391 |
| 1.38 | 0.726 | −2.545 | −0.990 |

Note:
the maximum value of Y42 is 1.38 mm

The content of Table 4-4 may be deduced from Table 4-1:

TABLE 4-4

| Embodiment 4 | | | |
|---|---|---|---|
| f (mm) | 1.61 | f/f2 + |f/f3| + f/f4 | 4.61 |
| Fno | 2.25 | |Sag32|/CT3 | 2.06 |
| HFOV (deg.) | 47.2 | |Y11/Y42| | 0.61 |
| V1 + V3 | 46.6 | (T12 + T23 + T34)/Td | 0.22 |
| CT1/CT3 | 2.100 | Sd/Td | 0.72 |
| T12/T23 | 1.528 | Td/ImgH | 1.50 |
| (R7 + R8)/(R7 − R8) | −1.11 | — | — |

The Fifth Embodiment (Embodiment 5)

Figure 5A:
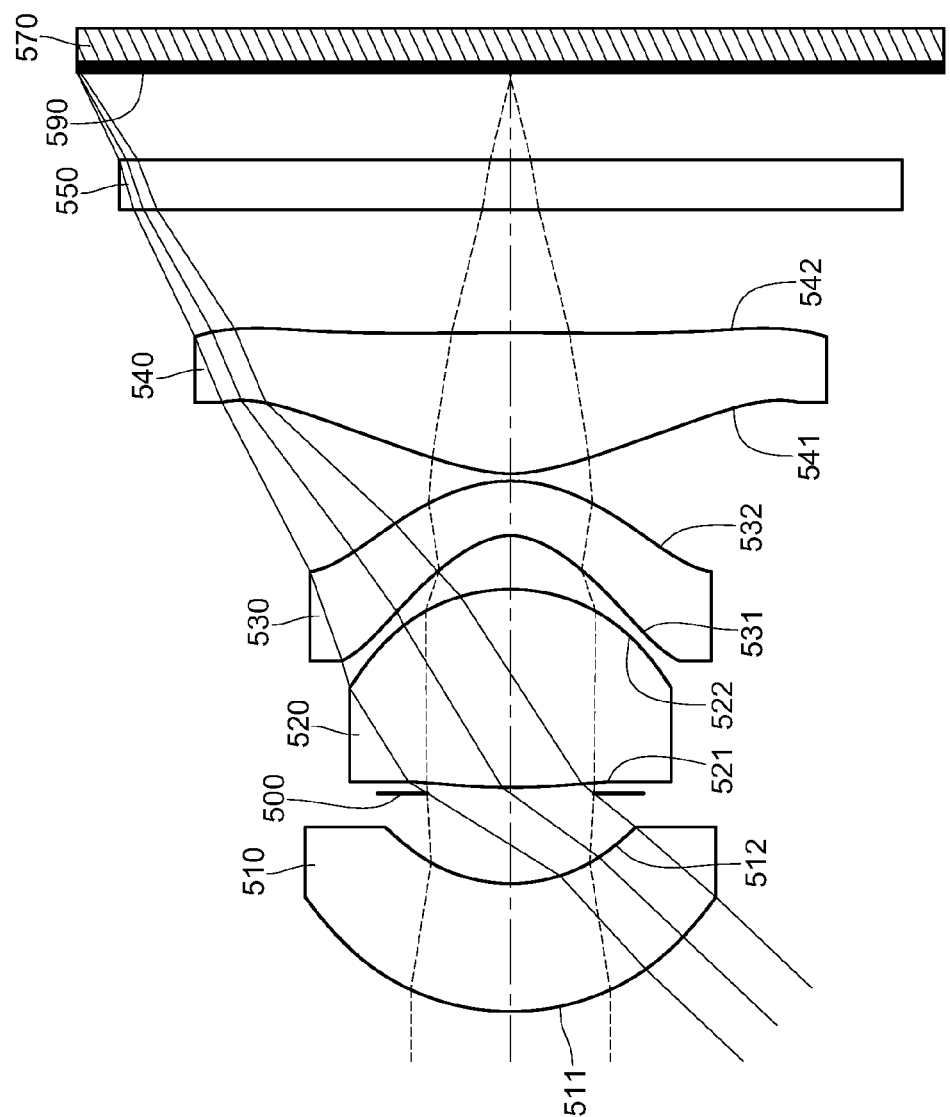
FIG. 5A is a structural schematic diagram of an image capturing lens assembly according to a fifth embodiment of the disclosure.
Figure 5B:
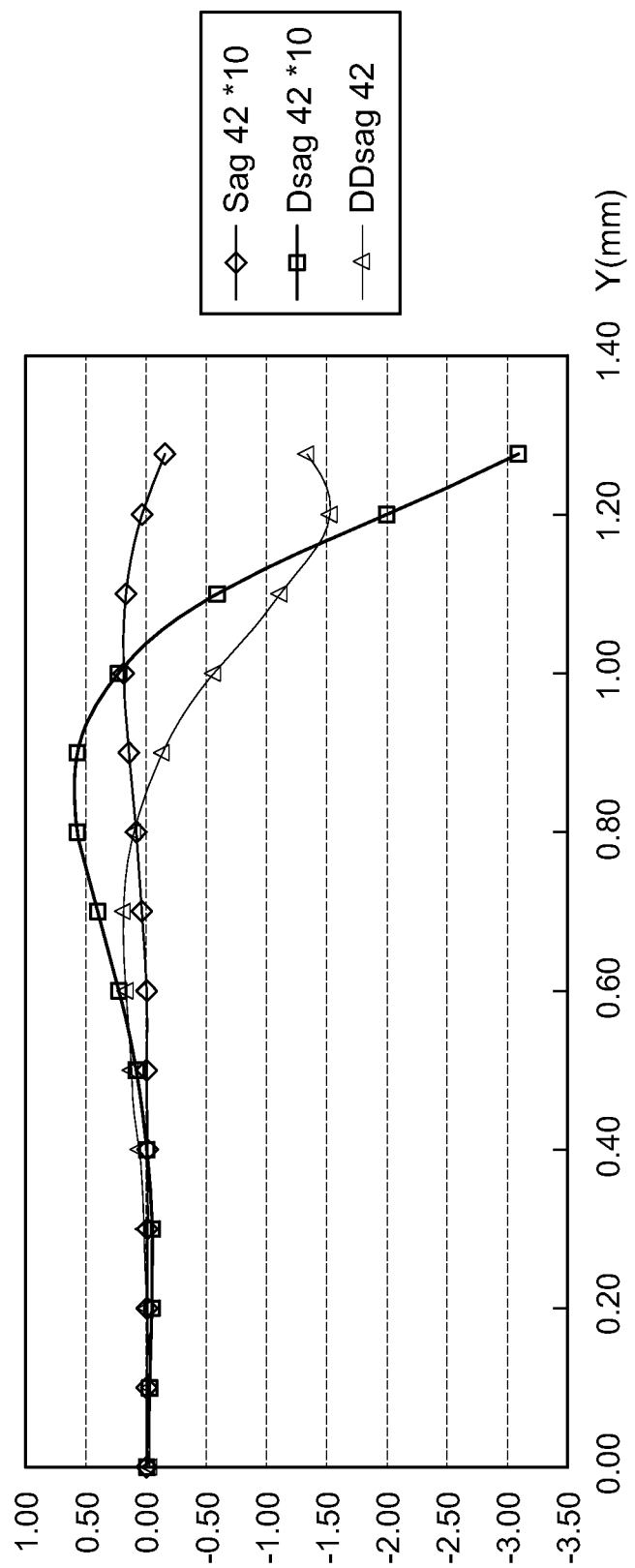
FIG. 5B is a schematic diagram of a horizontal distance curve, a derivative curve and a second-order derivative curve of an image-side surface of the fourth lens element in FIG. 5A.

Referring to FIGS. 5A to 5E, the lens assembly of the fifth embodiment comprises, from an object side to an image side along an optical axis in sequence (from left to right in FIG. 5A), a first lens element 510, a stop, which here is an aperture stop 500, a second lens element 520, a third lens element 530, a fourth lens element 540, an IR-cut filter 550 and an image plane 590 disposed at an image sensor 570.

A first lens element 510 made of plastic with negative refractive power has a convex object-side surface 511 and a concave image-side surface 512, and the object-side surface 511 and the image-side surface 512 are aspheric. A second lens element 520 made of plastic with positive refractive power has a convex object-side surface 521 and a convex image-side surface 522, and the object-side surface 521 and the image-side surface 522 are aspheric. A third lens element 530 made of plastic with negative refractive power has a concave object-side surface 531 and a convex image-side surface 532, and the object-side surface 531 and the image-side surface 532 are aspheric. A fourth lens element 540 made of plastic with positive refractive power has a convex object-side surface 541 and a convex image-side surface 542, and the object-side surface 541 and the image-side surface 542 are aspheric.

Sag42 is a distance in parallel with the optical axis from a point on the image-side surface 542 of the fourth lens element 540 to an axial vertex on the image-side surface 542 of the fourth lens element 540, Y is an off-axis height between a point on the image-side surface 542 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 5-1 below:

TABLE 5-1

Embodiment 5
f = 1.65 mm, Fno = 2.05, HFOV = 46.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.971 | ASP | 0.518 | Plastic | 1.544 | 55.9 | −9.19 |
| 2 | | 0.660 | ASP | 0.364 | | | | |
| 3 | Ape. Stop | Plano | | 0.024 | | | | |
| 4 | Lens 2 | 2.453 | ASP | 0.802 | Plastic | 1.544 | 55.9 | 1.12 |
| 5 | | −0.716 | ASP | 0.217 | | | | |
| 6 | Lens 3 | −0.245 | ASP | 0.221 | Plastic | 1.650 | 21.4 | −0.89 |
| 7 | | −0.574 | ASP | 0.030 | | | | |
| 8 | Lens 4 | 0.578 | ASP | 0.569 | Plastic | 1.535 | 56.3 | 1.07 |
| 9 | | −31.118 | ASP | 0.500 | | | | |
| 10 | IR-filter | Plano | | 0.200 | Glass | 1.517 | 64.2 | — |
| 11 | | Plano | | 0.353 | | | | |
| 12 | Image | Plano | | — | | | | |

Note:
Reference wavelength is d-line 587.6 nm

The detailed data of the parameters of the aspheric surfaces are shown in Table 5-2 below:

TABLE 5-2

| Aspheric Coefficients | | | | |
|---|---|---|---|---|
| Surface # | 1 | 2 | 4 | 5 |
| k = | −4.8629E+00 | 1.6665E−01 | 1.1094E+00 | −7.3337E−01 |
| A4 = | 6.7012E−01 | −2.0754E−01 | −3.2511E−01 | −2.8540E−01 |
| A6 = | −7.9155E−01 | 2.7855E+00 | 2.0308E+00 | −2.0855E−01 |
| A8 = | 1.3993E+00 | −1.2684E+01 | −2.5978E+01 | −2.6917E+00 |
| A10 = | −1.0114E+00 | 1.3927E+00 | 6.8192E+01 | 4.8440E+00 |
| A12 = | 4.9308E−02 | −7.2997E−11 | −9.3496E−11 | 3.1665E−10 |

TABLE 5-2-continued

| | Aspheric Coefficients | | | |
|---|---|---|---|---|
| Surface # | 6 | 7 | 8 | 9 |
| k = | −2.0187E+00 | −8.3953E−01 | −7.3848E+00 | −1.0000E+00 |
| A4 = | −1.1750E+00 | 5.9210E−01 | −1.5385E−02 | 3.3493E−02 |
| A6 = | 2.1392E+00 | −8.7477E−01 | 2.9286E−02 | 5.7917E−02 |
| A8 = | −2.2651E+00 | 2.1229E+00 | −3.9533E−02 | −6.8027E−02 |
| A10 = | 1.1283E+01 | −1.1743E+00 | −4.1627E−03 | 7.8441E−03 |
| A12 = | −1.2850E+01 | 1.1994E−02 | 2.6510E−03 | 3.2615E−03 |

The detailed relation among the off-axis height Y, the distance Sag42, the derivative Dsag42 and the second-order derivative DDsag42 are shown in Table 5-3 below:

TABLE 5-3

| | Embodiment 5 | | |
|---|---|---|---|
| Y (mm) | Sag42*10 | Dsag42*10 | DDsag42 |
| 0.00 | 0.000 | 0.000 | −0.032 |
| 0.10 | −0.002 | −0.031 | −0.028 |
| 0.20 | −0.006 | −0.053 | −0.014 |
| 0.30 | −0.011 | −0.053 | 0.015 |
| 0.40 | −0.015 | −0.016 | 0.062 |
| 0.50 | −0.013 | 0.075 | 0.121 |
| 0.60 | 0.002 | 0.224 | 0.175 |
| 0.70 | 0.033 | 0.410 | 0.187 |
| 0.80 | 0.083 | 0.565 | 0.103 |
| 0.90 | 0.141 | 0.563 | −0.137 |
| 1.00 | 0.184 | 0.227 | −0.566 |
| 1.10 | 0.170 | −0.613 | −1.121 |
| 1.20 | 0.044 | −1.968 | −1.524 |
| 1.28 | −0.149 | −3.096 | −1.327 |

Note:
the maximum value of Y42 is 1.28 mm

The content of Table 5-4 may be deduced from Table 5-1:

TABLE 5-4

| | Embodiment 5 | | |
|---|---|---|---|
| f (mm) | 1.65 | f/f2 + \|f/f3\| + f/f4 | 4.87 |
| Fno | 2.05 | \|Sag32\|/CT3 | 1.66 |
| HFOV (deg.) | 46.6 | \|Y11/Y42\| | 0.65 |
| V1 + V3 | 77.3 | (T12 + T23 + T34)/Td | 0.23 |
| CT1/CT3 | 2.344 | Sd/Td | 0.68 |
| T12/T23 | 1.788 | Td/ImgH | 1.57 |
| (R7 + R8)/(R7 − R8) | −0.96 | — | — |

The Sixth Embodiment (Embodiment 6)

Figure 6A:
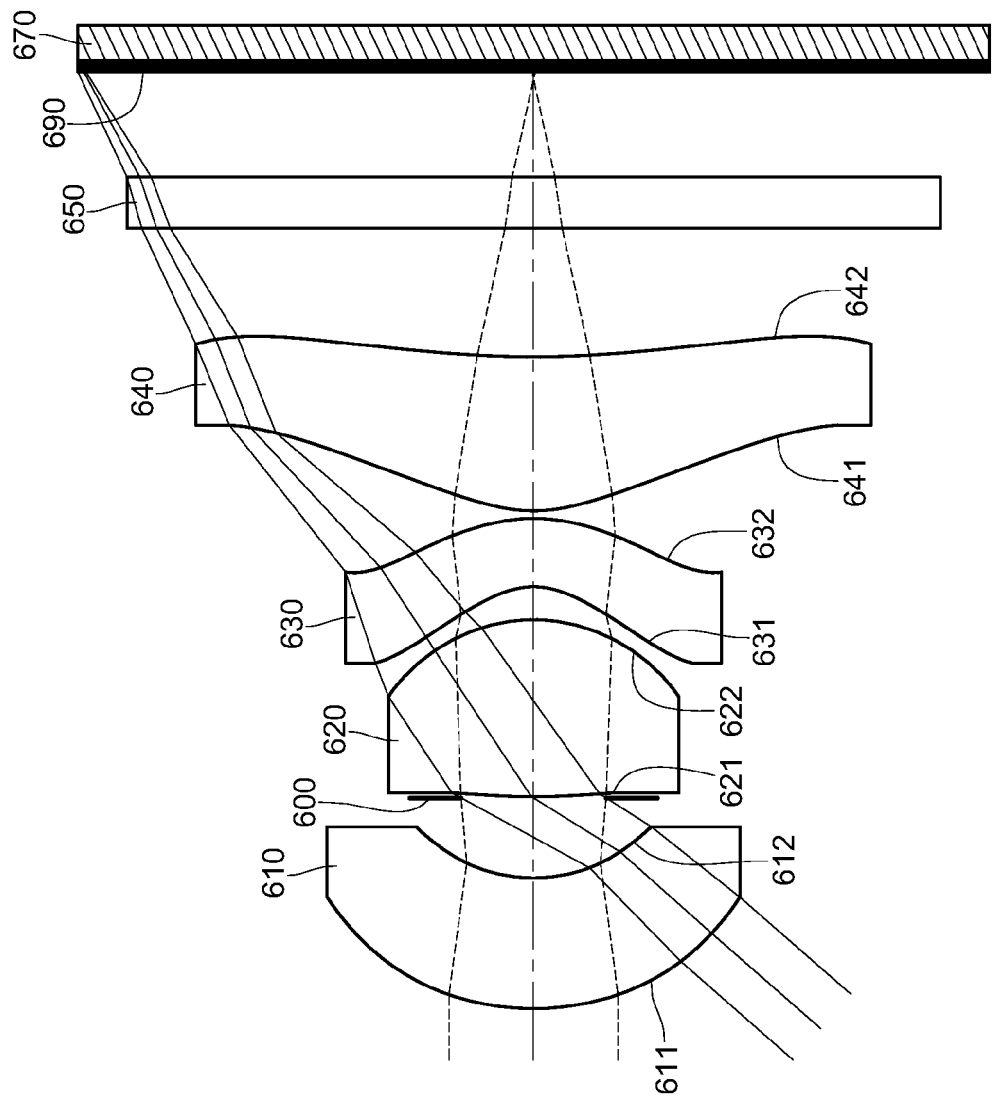
FIG. 6A is a structural schematic diagram of an image capturing lens assembly according to a sixth embodiment of the disclosure.
Figure 6B:
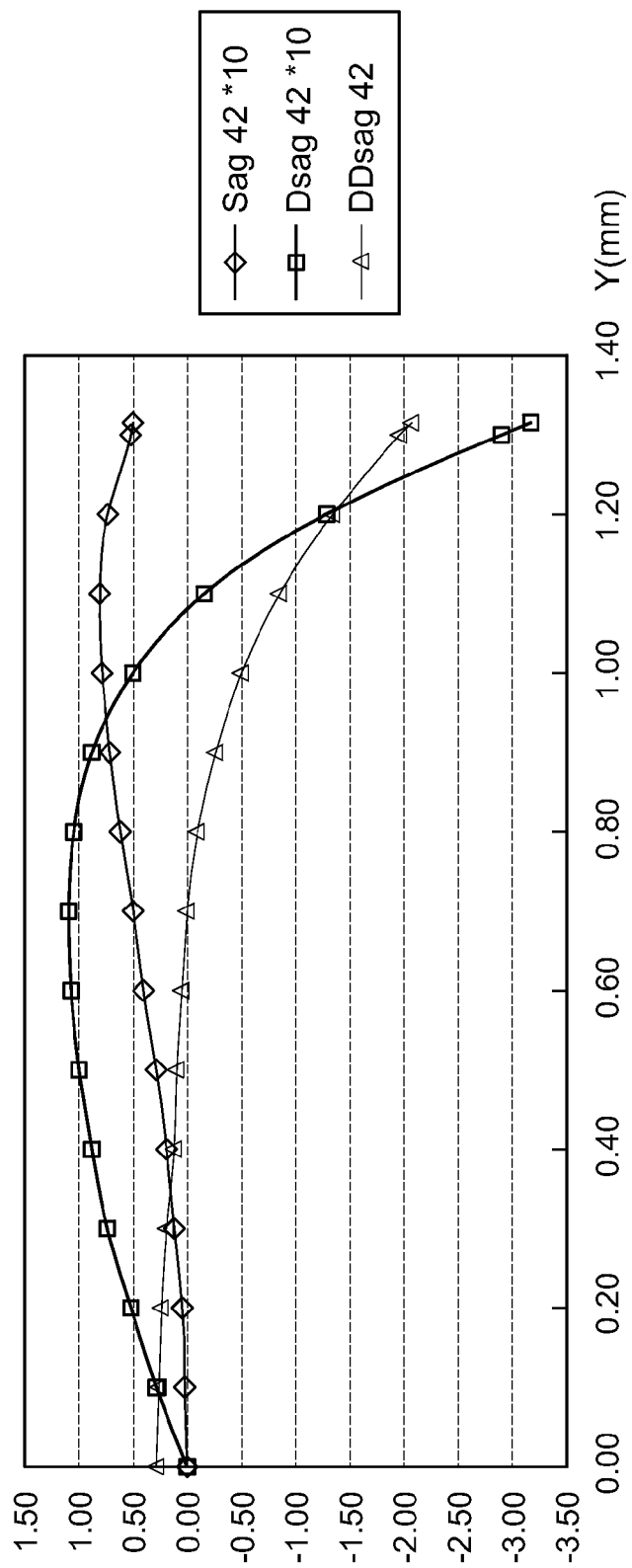
FIG. 6B is a schematic diagram of a horizontal distance curve, a derivative curve and a second-order derivative curve of an image-side surface of the fourth lens element in FIG. 6A.

Referring to FIGS. 6A to 6E, the lens assembly of the sixth embodiment comprises, from an object side to an image side along an optical axis in sequence (from left to right in FIG. 6A), a first lens element 610, a stop, which here is an aperture stop 600, a second lens element 620, a third lens element 630, a fourth lens element 640, an IR-cut filter 650 and an image plane 690 disposed at an image sensor 670.

A first lens element 610 made of plastic with negative refractive power has a convex object-side surface 611 and a concave image-side surface 612, and the object-side surface 611 and the image-side surface 612 are aspheric. A second lens element 620 made of plastic with positive refractive power has a convex object-side surface 621 and a convex image-side surface 622, and the object-side surface 621 and the image-side surface 622 are aspheric. A third lens element 630 made of plastic with negative refractive power has a concave object-side surface 631 and a convex image-side surface 632, and the object-side surface 631 and the image-side surface 632 are aspheric. A fourth lens element 640 made of plastic with positive refractive power has a convex object-side surface 641 and a concave image-side surface 642, and the object-side surface 641 and the image-side surface 642 are aspheric.

Sag42 is a distance in parallel with the optical axis from a point on the image-side surface 642 of the fourth lens element 640 to an axial vertex on the image-side surface 642 of the fourth lens element 640, Y is an off-axis height between a point on the image-side surface 642 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 6-1 below:

TABLE 6-1

| | | Embodiment 6 | | | | |
|---|---|---|---|---|---|---|
| | | f = 1.54 mm, Fno = 2.35, HFOV = 48.8 deg. | | | | |
| Surface # | | Curvature Radius | Thickness | Material | Index | Abbe # | Focal Length |
| 0 | Object | Plano | Infinity | | | | |
| 1 | Lens 1 | 1.048 ASP | 0.509 | Plastic | 1.640 | 23.3 | −4.82 |
| 2 | | 0.634 ASP | 0.311 | | | | |
| 3 | Ape. Stop | Plano | 0.005 | | | | |
| 4 | Lens 2 | 2.426 ASP | 0.690 | Plastic | 1.535 | 56.3 | 1.00 |
| 5 | | −0.620 ASP | 0.128 | | | | |
| 6 | Lens 3 | −0.283 ASP | 0.265 | Plastic | 1.640 | 23.3 | −0.97 |
| 7 | | −0.712 ASP | 0.030 | | | | |
| 8 | Lens 4 | 0.556 ASP | 0.600 | Plastic | 1.535 | 56.3 | 1.15 |
| 9 | | 3.552 ASP | 0.500 | | | | |
| 10 | IR-filter | Plano | 0.200 | Glass | 1.517 | 64.2 | — |

TABLE 6-1-continued

Embodiment 6
f = 1.54 mm, Fno = 2.35, HFOV = 48.8 deg.

| Surface # | | Curvature Radius | Thickness | Material Index | Abbe # | Focal Length |
|---|---|---|---|---|---|---|
| 11 | | Plano | 0.411 | | | |
| 12 | Image | Plano | — | | | |

Note:
Reference wavelength is d-line 587.6 nm

The detailed data of the parameters of the aspheric surfaces are shown in Table 6-2 below:

TABLE 6-2

| | Aspheric Coefficients | | | |
|---|---|---|---|---|
| Surface # | 1 | 2 | 4 | 5 |
| k = | −5.6462E+00 | 3.6001E−01 | −2.0000E+01 | −1.6136E+00 |
| A4 = | 6.9622E−01 | 1.6692E−01 | −2.9742E−01 | 2.6693E−02 |
| A6 = | −7.4138E−01 | −7.9570E−02 | −3.0611E−02 | −2.4527E+00 |
| A8 = | 1.2733E+00 | −9.6382E−01 | −3.1197E+01 | −1.0235E+00 |
| A10 = | −8.0836E−01 | −4.9709E+01 | 1.4940E+02 | 5.5269E+00 |
| A12 = | 4.9308E−02 | −2.9597E−11 | −9.4633E−11 | 4.8196E−10 |
| Surface # | 6 | 7 | 8 | 9 |
| k = | −2.7366E+00 | −8.2406E−01 | −6.3174E+00 | 3.0000E+00 |
| A4 = | −4.5828E−01 | 4.1018E−01 | −5.2876E−02 | −1.3048E−01 |
| A6 = | 2.3910E+00 | −3.1820E−01 | 5.4049E−02 | 1.2724E−01 |
| A8 = | −3.0424E+00 | 2.5885E+00 | −5.9027E−02 | −1.0239E−01 |
| A10 = | 7.8932E+00 | −2.1510E+00 | 2.4000E−02 | 3.4643E−02 |
| A12 = | −9.6186E+00 | 1.6941E−02 | −4.2745E−03 | −4.8723E−03 |

The detailed relation among the off-axis height Y, the distance Sag42, the derivative Dsag42 and the second-order derivative DDsag42 are shown in Table 6-3 below:

TABLE 6-3

| | Embodiment 6 | | |
|---|---|---|---|
| Y (mm) | Sag42*10 | Dsag42*10 | DDsag42 |
| 0.00 | 0.000 | 0.000 | 0.282 |
| 0.10 | 0.014 | 0.277 | 0.268 |
| 0.20 | 0.054 | 0.527 | 0.230 |
| 0.30 | 0.118 | 0.733 | 0.180 |
| 0.40 | 0.199 | 0.887 | 0.130 |
| 0.50 | 0.294 | 0.996 | 0.088 |
| 0.60 | 0.397 | 1.064 | 0.050 |
| 0.70 | 0.505 | 1.091 | −0.001 |
| 0.80 | 0.613 | 1.049 | −0.092 |
| 0.90 | 0.711 | 0.883 | −0.254 |
| 1.00 | 0.783 | 0.510 | −0.509 |
| 1.10 | 0.803 | −0.170 | −0.867 |
| 1.20 | 0.735 | −1.260 | −1.334 |
| 1.30 | 0.533 | −2.891 | −1.963 |
| 1.31 | 0.490 | −3.173 | −2.073 |

Note:
the maximum value of Y42 is 1.31 mm

The content of Table 6-4 may be deduced from Table 6-1:

TABLE 6-4

| Embodiment 6 | | | |
|---|---|---|---|
| f (mm) | 1.54 | f/f2 + |f/f3| + f/f4 | 4.47 |
| Fno | 2.35 | |Sag32|/CT3 | 0.79 |
| HFOV (deg.) | 48.8 | |Y11/Y42| | 0.61 |
| V1 + V3 | 46.6 | (T12 + T23 + T34)/Td | 0.19 |
| CT1/CT3 | 1.921 | Sd/Td | 0.68 |
| T12/T23 | 2.469 | Td/ImgH | 1.45 |
| (R7 + R8)/(R7 − R8) | −1.37 | — | — |

The Seventh Embodiment (Embodiment 7)

Figure 7A:
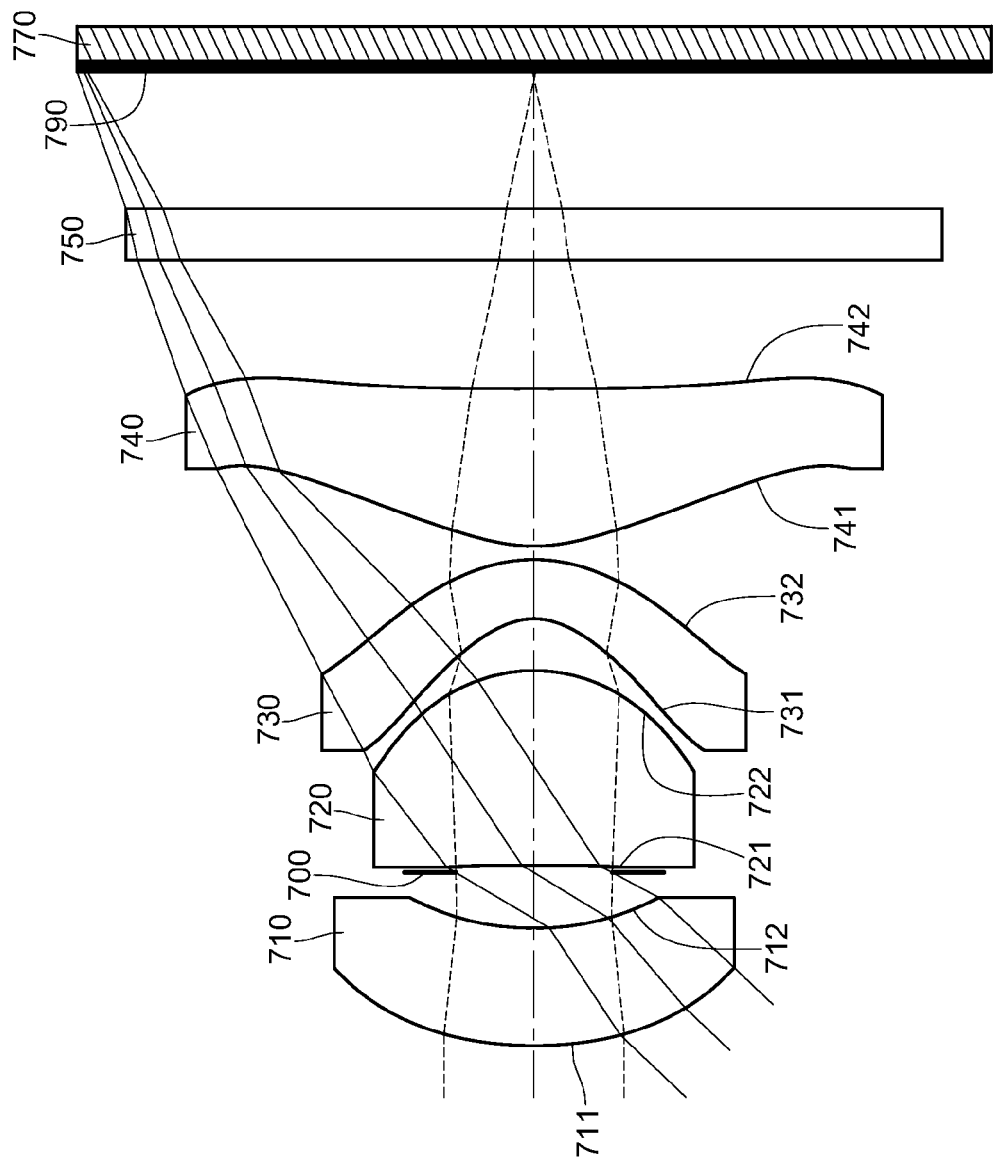
FIG. 7A is a structural schematic diagram of an image capturing lens assembly according to a seventh embodiment of the disclosure.
Figure 7B:
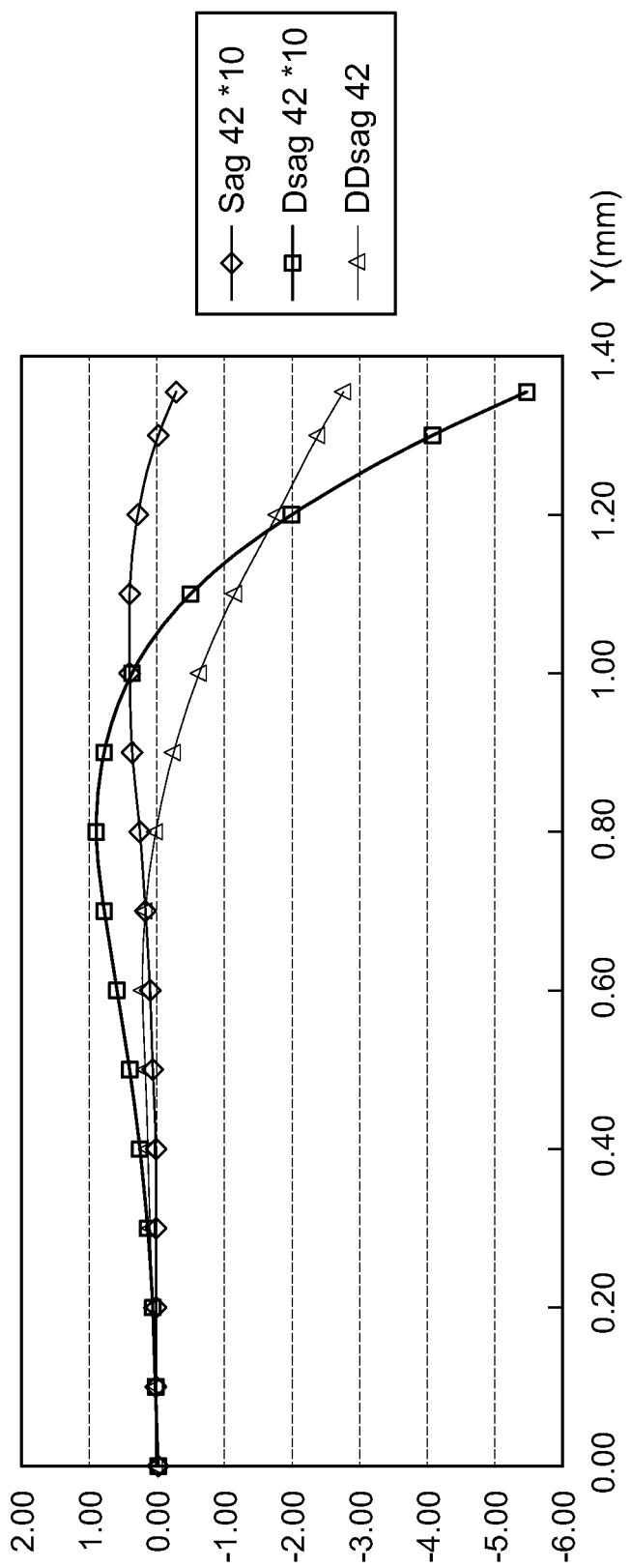
FIG. 7B is a schematic diagram of a horizontal distance curve, a derivative curve and a second-order derivative curve of an image-side surface of the fourth lens element in FIG. 7A.

Referring to FIGS. 7A to 7E, the lens assembly of the seventh embodiment comprises, from an object side to an image side along an optical axis in sequence (from left to right in FIG. 7A), a first lens element 710, a stop, which here is an aperture stop 700, a second lens element 720, a third lens element 730, a fourth lens element 740, an IR-cut filter 750 and an image plane 790 disposed at an image sensor 770.

A first lens element 710 made of plastic with negative refractive power has a convex object-side surface 711 and a concave image-side surface 712, and the object-side surface 711 and the image-side surface 712 are aspheric. A second lens element 720 made of plastic with positive refractive power has a concave object-side surface 721 and a convex image-side surface 722, and the object-side surface 721 and the image-side surface 722 are aspheric. A third lens element 730 made of plastic with negative refractive power has a concave object-side surface 731 and a convex image-side surface 732, and the object-side surface 731 and the image-side surface 732 are aspheric. A fourth lens element 740 made of plastic with positive refractive power has a convex object-side surface 741 and a concave image-side surface 742, and the object-side surface 741 and the image-side surface 742 are aspheric.

Sag42 is a distance in parallel with the optical axis from a point on the image-side surface 742 of the fourth lens element 740 to an axial vertex on the image-side surface 742 of the fourth lens element 740, Y is an off-axis height between a point on the image-side surface 742 and the optical axis, Dsag42 is a derivative of the distance Sag42 with the off-axis height Y, and DDsag42 is a second-order derivative of the distance Sag42 with respect to the off-axis height Y and has changed at least once from positive to negative, or vice versa.

The detailed data of the lens assembly are shown in Table 7-1 below:

TABLE 7-1

Embodiment 7
f = 1.65 mm, Fno = 2.35, HFOV = 46.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.431 | ASP | 0.458 | Plastic | 1.640 | 23.3 | −30.60 |
| 2 | | 1.167 | ASP | 0.216 | | | | |
| 3 | Ape. Stop | Plano | | 0.029 | | | | |
| 4 | Lens 2 | −74.237 | ASP | 0.758 | Plastic | 1.544 | 55.9 | 1.15 |
| 5 | | −0.625 | ASP | 0.202 | | | | |
| 6 | Lens 3 | −0.251 | ASP | 0.230 | Plastic | 1.640 | 23.3 | −0.88 |
| 7 | | −0.615 | ASP | 0.052 | | | | |
| 8 | Lens 4 | 0.608 | ASP | 0.614 | Plastic | 1.544 | 55.9 | 1.12 |
| 9 | | 54.713 | ASP | 0.500 | | | | |
| 10 | IR-filter | Plano | | 0.200 | Glass | 1.517 | 64.2 | — |
| 11 | | Plano | | 0.533 | | | | |
| 12 | Image | Plano | | — | | | | |

Note:
Reference wavelength is d-line 587.6 nm

The detailed data of the parameters of the aspheric surfaces are shown in Table 7-2 below:

TABLE 7-2

Aspheric Coefficients

| Surface # | 1 | 2 | 4 | 5 |
|---|---|---|---|---|
| k = | −1.0844E+01 | 2.9343E+00 | −5.0000E+01 | −8.0894E−01 |
| A4 = | 5.6840E−01 | 1.6060E−01 | −5.2604E−01 | −2.2791E−01 |
| A6 = | −5.5062E−01 | −5.3901E−01 | 2.5457E+00 | −3.9070E−01 |
| A8 = | 7.6816E−01 | −2.2273E+00 | −3.5186E+01 | −2.7095E+00 |
| A10 = | −2.9983E−01 | −1.6346E+00 | −5.6533E+00 | 5.7128E+00 |
| A12 = | −6.3313E−02 | −2.1712E+01 | 7.1115E+02 | 6.0354E−06 |

| Surface # | 6 | 7 | 8 | 9 |
|---|---|---|---|---|
| k = | −2.0226E+00 | −7.6131E−01 | −7.3560E+00 | 7.5000E+01 |
| A4 = | −1.4188E+00 | 3.8724E−01 | 4.5043E−03 | 6.1210E−02 |
| A6 = | 1.9489E+00 | −8.3592E−01 | 2.1228E−02 | 1.4928E−02 |
| A8 = | −7.0908E−01 | 1.9635E+00 | −5.8452E−02 | −6.8749E−02 |
| A10 = | 1.2382E+01 | −1.0249E+00 | 1.8788E−02 | 2.7937E−02 |
| A12 = | −1.7647E+01 | −3.0406E−02 | −2.1417E−03 | −3.7670E−03 |

The detailed relation among the off-axis height Y, the distance Sag42, the derivative Dsag42 and the second-order derivative DDsag42 are shown in Table 7-3 below:

TABLE 7-3

Embodiment 7

| Y (mm) | Sag42*10 | Dsag42*10 | DDsag42 |
|---|---|---|---|
| 0.00 | 0.000 | 0.000 | 0.018 |
| 0.10 | 0.001 | 0.021 | 0.026 |
| 0.20 | 0.005 | 0.056 | 0.048 |
| 0.30 | 0.013 | 0.122 | 0.085 |
| 0.40 | 0.031 | 0.231 | 0.133 |
| 0.50 | 0.061 | 0.388 | 0.179 |
| 0.60 | 0.109 | 0.581 | 0.201 |
| 0.70 | 0.177 | 0.770 | 0.164 |
| 0.80 | 0.261 | 0.877 | 0.032 |
| 0.90 | 0.346 | 0.790 | −0.229 |
| 1.00 | 0.408 | 0.371 | −0.632 |
| 1.10 | 0.405 | −0.515 | −1.157 |
| 1.20 | 0.286 | −1.968 | −1.758 |
| 1.30 | −0.010 | −4.039 | −2.388 |
| 1.36 | −0.270 | −5.452 | −2.753 |

Note:
the maximum value of Y42 is 1.36 mm

The content of Table 7-4 may be deduced from Table 7-1:

TABLE 7-4

| Embodiment 7 | | | |
|---|---|---|---|
| f (mm) | 1.65 | f/f2 + |f/f3| + f/f4 | 4.76 |
| Fno | 2.35 | |Sag32|/CT3 | 1.94 |
| HFOV (deg.) | 46.5 | |Y11/Y42| | 0.57 |
| V1 + V3 | 46.6 | (T12 + T23 + T34)/Td | 0.19 |
| CT1/CT3 | 1.991 | Sd/Td | 0.74 |
| T12/T23 | 1.213 | Td/ImgH | 1.46 |
| (R7 + R8)/(R7 − R8) | −1.02 | — | — |

The Eighth Embodiment (Embodiment 8)

Figure 8A:
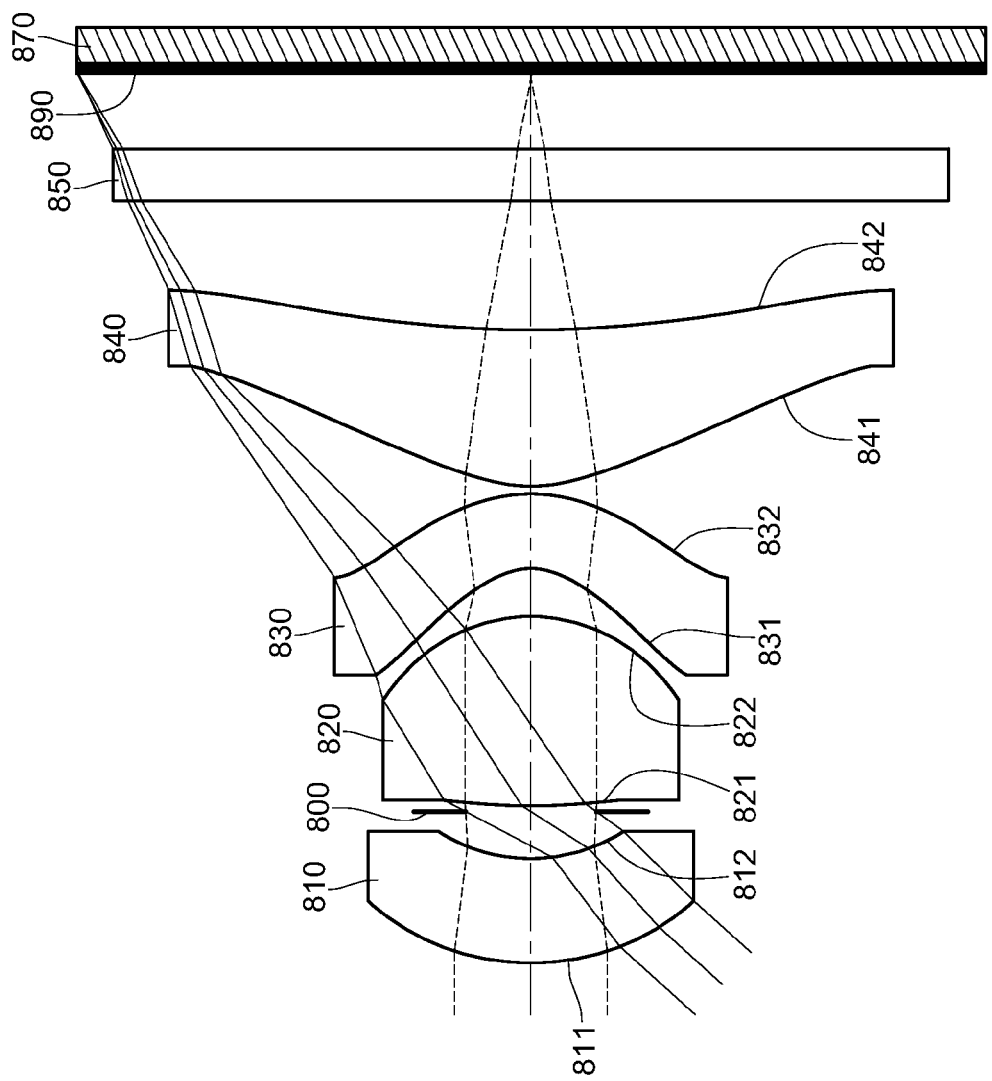
FIG. 8A is a structural schematic diagram of an image capturing lens assembly according to an eighth embodiment of the disclosure.
Figure 8B:
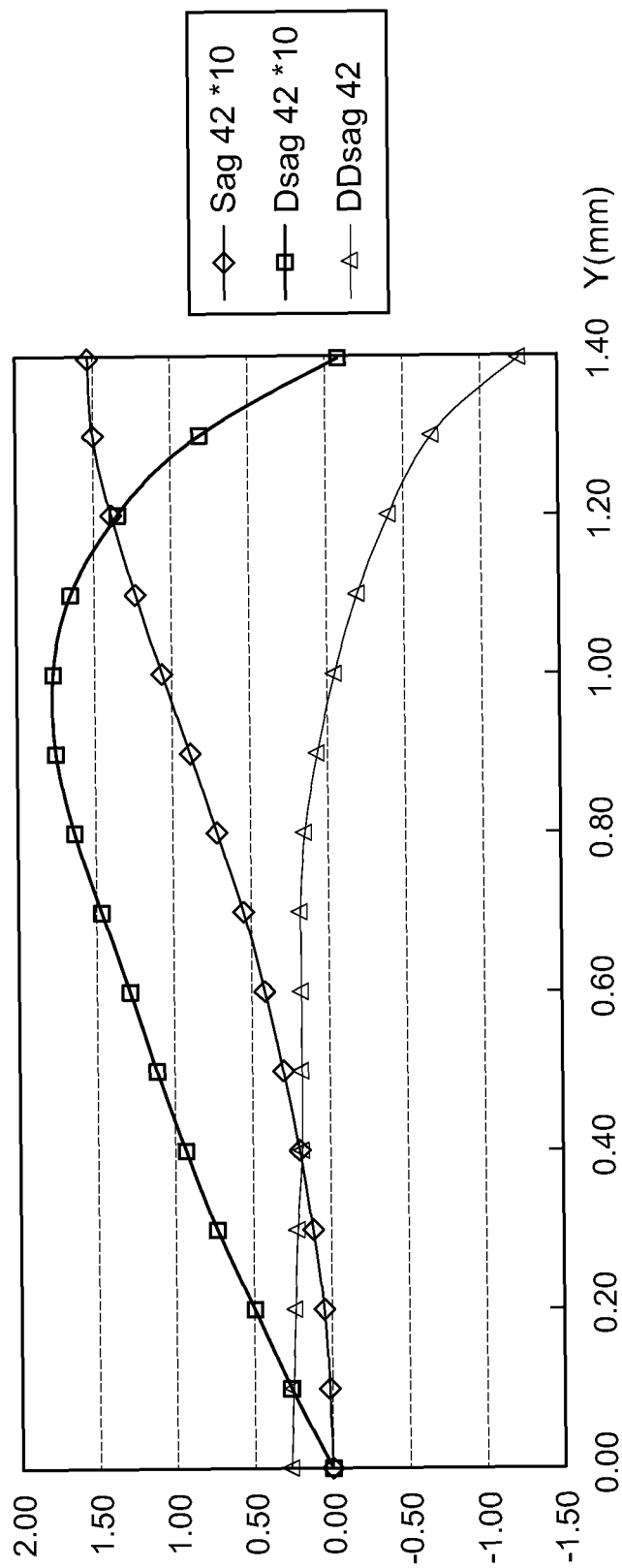
FIG. 8B is a schematic diagram of a horizontal distance curve, a derivative curve and a second-order derivative curve of an image-side surface of the fourth lens element in FIG. 8A.

Referring to FIGS. 8A to 8E, the lens assembly of the eighth embodiment comprises, from an object side to an image side along an optical axis in sequence (from left to right in FIG. 8A), a first lens element 810, a stop, which here is an aperture stop 800, a second lens element 820, a third lens element 830, a fourth lens element 840, an IR-cut filter 850 and an image plane 890 disposed at an image sensor 870.

A first lens element 810 made of plastic with negative refractive power has a convex object-side surface 811 and a concave image-side surface 812, and the object-side surface 811 and the image-side surface 812 are aspheric. A second lens element 820 made of plastic with positive refractive power has a convex object-side surface 821 and a convex image-side surface 822, and the object-side surface 821 and the image-side surface 822 are aspheric. A third lens element 830 made of plastic with negative refractive power has a concave object-side surface 831 and a convex image-side surface 832, and the object-side surface 831 and the image-side surface 832 are aspheric. A fourth lens element 840 made of plastic with positive refractive power has a convex object-side surface 841 and a concave image-side surface 842, and the object-side surface 841 and the image-side surface 842 are aspheric.

Sag42 is a distance in parallel with the optical axis from a point on the image-side surface 842 of the fourth lens element 840 to an axial vertex on the image-side surface 842 of the fourth lens element 840, Y is an off-axis height between a point on the image-side surface 842 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 8-1 below:

TABLE 8-1

Embodiment 8
f = 1.55 mm, Fno = 2.63, HFOV = 47.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.007 | ASP | 0.403 | Plastic | 1.640 | 23.3 | −6.77 |
| 2 | | 0.690 | ASP | 0.181 | | | | |
| 3 | Ape. Stop | Plano | | 0.022 | | | | |
| 4 | Lens 2 | 2.210 | ASP | 0.732 | Plastic | 1.535 | 56.3 | 0.99 |
| 5 | | −0.616 | ASP | 0.185 | | | | |
| 6 | Lens 3 | −0.246 | ASP | 0.288 | Plastic | 1.640 | 23.3 | −0.92 |
| 7 | | −0.617 | ASP | 0.030 | | | | |
| 8 | Lens 4 | 0.561 | ASP | 0.603 | Plastic | 1.535 | 56.3 | 1.16 |
| 9 | | 3.778 | ASP | 0.500 | | | | |
| 10 | IR-filter | Plano | | 0.200 | Glass | 1.517 | 64.2 | — |
| 11 | | Plano | | 0.289 | | | | |
| 12 | Image | Plano | | — | | | | |

Note:
Reference wavelength is d-line 587.6 nm

The detailed data of the parameters of the aspheric surfaces are shown in Table 8-2 below:

TABLE 8-2

| Aspheric Coefficients | | | | |
|---|---|---|---|---|
| Surface # | 1 | 2 | 4 | 5 |
| k = | −4.1170E.00 | 1.4346E+00 | −1.0198E+01 | −1.1360E+00 |
| A4 = | 6.3172E−01 | −1.7421E−01 | −8.9613E−02 | −1.0238E−02 |
| A6 = | −5.5186E−01 | −1.7561E+00 | 8.8994E−02 | −1.9876E+00 |
| A8 = | 1.2903E+00 | 1.8120E+00 | −2.1353E+01 | −2.0148E+00 |
| A10 = | −9.3040E−01 | −1.7644E+02 | 1.1003E+02 | 7.1457E+00 |
| A12 = | −1.4356E+00 | 4.6285E−07 | 6.3138E−07 | 6.3391E−07 |
| Surface # | 6 | 7 | 8 | 9 |
| k = | −2.1375E+00 | −7.6228E−01 | −5.4509E+00 | 4.1056E+00 |
| A4 = | −1.0731E+00 | 3.9324E−01 | −1.4098E−02 | −8.4979E−02 |
| A6 = | 2.0353E+00 | −5.5830E−01 | 4.3488E−02 | 1.0664E−01 |
| A8 = | −9.6644E−01 | 2.2469E+00 | −5.4398E−02 | −9.1886E−02 |
| A10 = | 1.2987E+01 | −1.2148E+00 | 2.3401E−02 | 3.4553E−02 |
| A12 = | −2.0148E+01 | 1.1995E−02 | −3.8340E−03 | −5.3250E−03 |

The detailed relation among the off-axis height Y, the distance Sag42, the derivative Dsag42 and the second-order derivative DDsag42 are shown in Table 8-3 below:

TABLE 8-3

Embodiment 8

| Y (mm) | Sag42*10 | Dsag42*10 | DDsag42 |
|---|---|---|---|
| 0.00 | 0.000 | 0.000 | 0.265 |
| 0.10 | 0.013 | 0.262 | 0.256 |
| 0.20 | 0.052 | 0.508 | 0.235 |
| 0.30 | 0.114 | 0.729 | 0.209 |
| 0.40 | 0.197 | 0.927 | 0.189 |
| 0.50 | 0.299 | 1.111 | 0.181 |
| 0.60 | 0.419 | 1.291 | 0.181 |
| 0.70 | 0.557 | 1.471 | 0.176 |
| 0.80 | 0.713 | 1.635 | 0.146 |
| 0.90 | 0.882 | 1.749 | 0.074 |
| 1.00 | 1.059 | 1.767 | −0.045 |
| 1.10 | 1.231 | 1.645 | −0.204 |
| 1.20 | 1.382 | 1.348 | −0.397 |
| 1.30 | 1.493 | 0.822 | −0.683 |
| 1.40 | 1.534 | −0.078 | −1.248 |

Note:
the maximum value of Y42 is 1.40 mm

The content of Table 8-4 may be deduced from Table 8-1:

TABLE 8-4

Embodiment 8

| f (mm) | 1.55 | f/f2 + |f/f3| + f/f4 | 4.58 |
|---|---|---|---|
| Fno | 2.63 | |Sag32|/CT3 | 1.12 |
| HFOV (deg.) | 47.9 | |Y11/Y42| | 0.45 |
| V1 + V3 | 46.6 | (T12 + T23 + T34)/Td | 0.17 |
| CT1/CT3 | 1.399 | Sd/Td | 0.76 |
| T12/T23 | 1.097 | Td/ImgH | 1.40 |
| (R7 + R8)/(R7 − R8) | −1.35 | — | — |

The Ninth Embodiment (Embodiment 9)

Figure 9A:
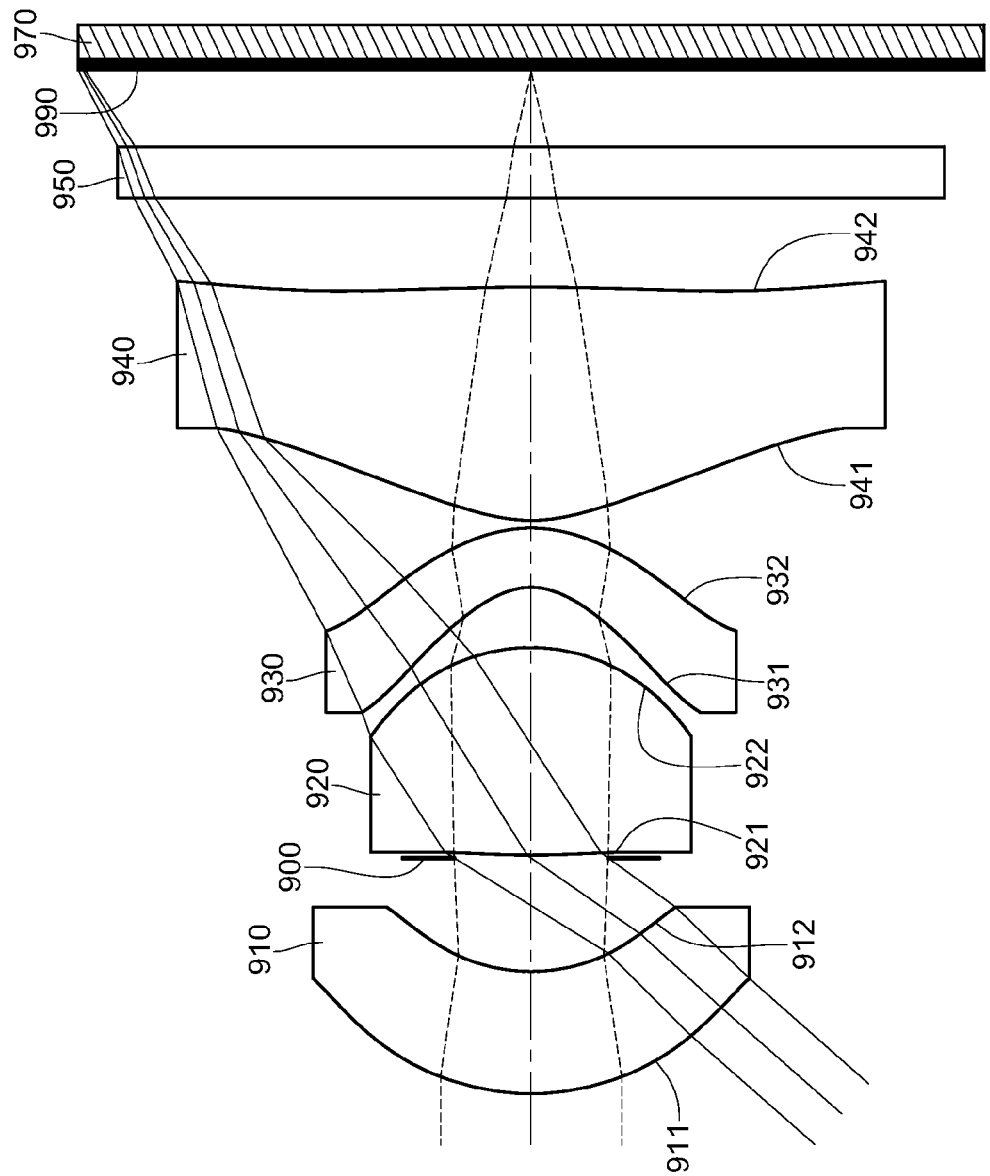
FIG. 9A is a structural schematic diagram of an image capturing lens assembly according to a ninth embodiment of the disclosure.
Figure 9B:
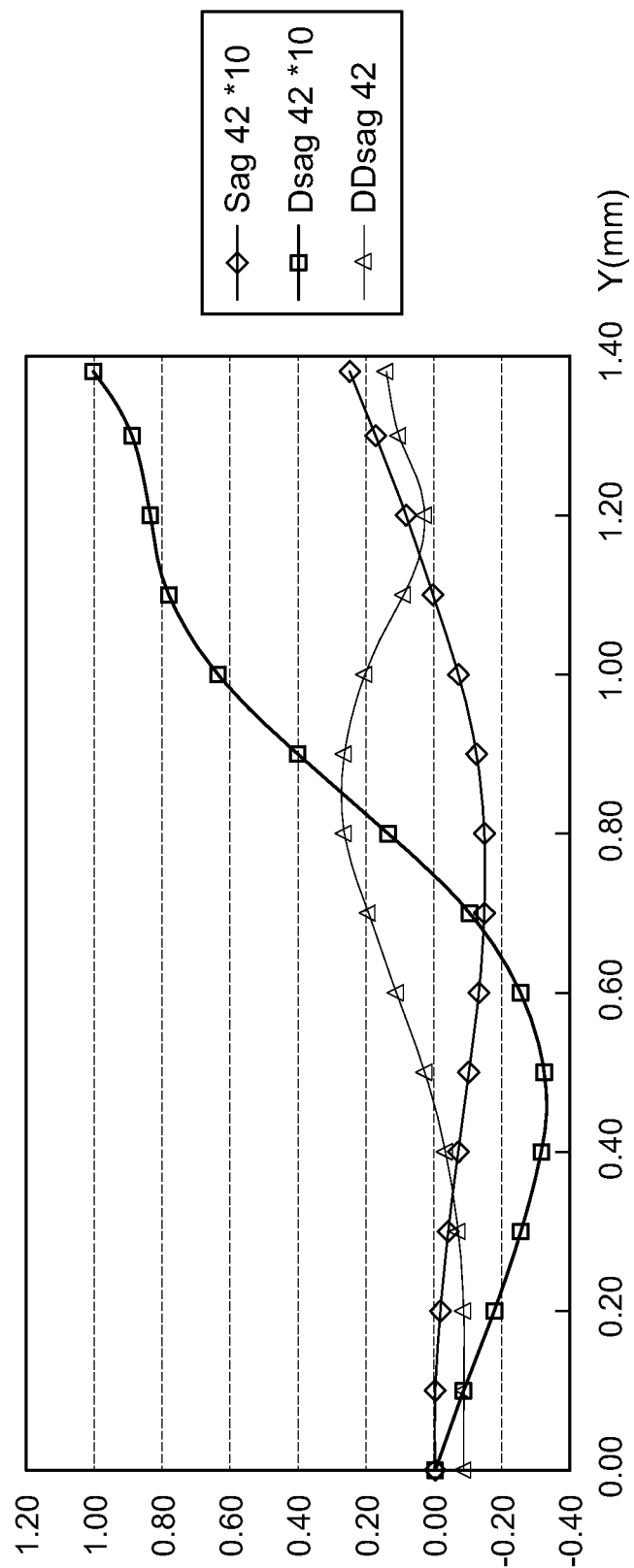
FIG. 9B is a schematic diagram of a horizontal distance curve, a derivative curve and a second-order derivative curve of an image-side surface of the fourth lens element in FIG. 9A.

Referring to FIGS. 9A to 9E, the lens assembly of the ninth embodiment comprises, from an object side to an image side along an optical axis in sequence (from left to right in FIG. 9A), a first lens element 910, a stop, which here is an aperture stop 900, a second lens element 920, a third lens element 930, a fourth lens element 940, an IR-cut filter 950 and an image plane 990 disposed at an image sensor 970.

A first lens element 910 made of plastic with negative refractive power has a convex object-side surface 911 and a concave image-side surface 912, and the object-side surface 911 and the image-side surface 912 are aspheric. A second lens element 920 made of plastic with positive refractive power has a convex object-side surface 921 and a convex image-side surface 922, and the object-side surface 921 and the image-side surface 922 are aspheric. A third lens element 930 made of plastic with negative refractive power has a concave object-side surface 931 and a convex image-side surface 932, and the object-side surface 931 and the image-side surface 932 are aspheric. A fourth lens element 940 made of plastic with positive refractive power has a convex object-side surface 941 and a convex image-side surface 942, and the object-side surface 941 and the image-side surface 942 are aspheric.

Sag42 is a distance in parallel with the optical axis from a point on the image-side surface 942 of the fourth lens element 940 to an axial vertex on the image-side surface 942 of the fourth lens element 940, Y is an off-axis height between a point on the image-side surface 942 and the optical axis, Dsag42 is a derivative of the distance Sag42 with respect to the off-axis height Y, and DDsag42 is a second-order derivative of the distance Sag42 with respect to the off-axis height Y and has changed at least once from positive to negative, or vice versa.

The detailed data of the lens assembly are shown in Table 9-1 below:

TABLE 9-1

Embodiment 9
f = 1.56 mm, Fno = 2.20, HFOV = 48.6 deg

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.980 | ASP | 0.477 | Plastic | 1.634 | 23.8 | −8.69 |
| 2 | | 0.675 | ASP | 0.444 | | | | |
| 3 | Ape. Stop | Plano | | 0.011 | | | | |
| 4 | Lens 2 | 3.419 | ASP | 0.811 | Plastic | 1.544 | 55.9 | 1.19 |
| 5 | | −0.728 | ASP | 0.236 | | | | |
| 6 | Lens 3 | −0.249 | ASP | 0.231 | Plastic | 1.650 | 21.4 | −0.98 |
| 7 | | −0.560 | ASP | 0.030 | | | | |
| 8 | Lens 4 | 0.593 | ASP | 0.911 | Plastic | 1.535 | 56.3 | 1.08 |
| 9 | | −11.102 | ASP | 0.500 | | | | |
| 10 | IR-filter | Plano | | 0.200 | Glass | 1.517 | 64.2 | — |
| 11 | | Plano | | 0.298 | | | | |
| 12 | Image | Plano | | — | | | | |

Note:
Reference wavelength is d-line 587.6 nm

The detailed data of the parameters of the aspheric surfaces are shown in Table 9-2 below:

TABLE 9-2

Aspheric Coefficients

| Surface # | 1 | 2 | 4 | 5 |
|---|---|---|---|---|
| k = | −5.3878E+00 | 9.5660E−02 | −2.4289E+00 | −7.7841E−01 |
| A4 = | 6.7582E−01 | −2.8264E−01 | −3.4541E−01 | −2.6903E−01 |
| A6 = | −8.1639E−01 | 2.5297E+00 | 8.0123E−01 | −1.1747E−01 |
| A8 = | 1.3611E+00 | −1.1814E+01 | −2.4903E+01 | −2.4491E+00 |
| A10 = | −1.0185E+00 | 2.6396E+00 | 8.9219E+01 | 4.2613E+00 |
| A12 = | 2.4132E−02 | −1.9977E+00 | 1.7897E+01 | −5.2404E−09 |
| A14 = | −4.4358E−02 | −7.0505E+00 | −3.1148E−03 | −3.4962E−08 |
| A16 = | −7.4874E−02 | −1.7133E+01 | −2.1570E−08 | −1.9710E−08 |

| Surface # | 6 | 7 | 8 | 9 |
|---|---|---|---|---|
| k = | −2.0060E+00 | −8.1899E−01 | −6.7131E+00 | −1.0000E+00 |
| A4 = | −1.1313E+00 | 5.6280E−01 | −2.2819E−02 | −7.3133E−04 |
| A6 = | 2.1682E+00 | −8.9282E−01 | 2.8188E−02 | 8.9882E−02 |
| A8 = | −2.3213E+00 | 2.1422E+00 | −2.9059E−02 | −6.1382E−02 |
| A10 = | 1.1074E+01 | −1.1318E+00 | 1.4913E−03 | 6.8866E−03 |
| A12 = | −1.2850E+01 | 1.1992E−02 | 3.7779E−03 | 3.7358E−03 |
| A14 = | −3.5375E−08 | −3.5337E−08 | 3.1842E−04 | −5.9315E−05 |
| A16 = | −1.9898E−08 | −1.9888E−08 | −5.9157E−04 | −2.6497E−04 |

The detailed relation among the off-axis height Y, the distance Sag42, the derivative Dsag42 and the second-order derivative DDsag42 are shown in Table 9-3 below:

TABLE 9-3

Embodiment 9

| Y (mm) | Sag42*10 | Dsag42*10 | DDsag42 |
|---|---|---|---|
| 0.00 | 0.000 | 0.000 | −0.090 |
| 0.10 | −0.005 | −0.090 | −0.090 |
| 0.20 | −0.018 | −0.179 | −0.086 |
| 0.30 | −0.040 | −0.259 | −0.072 |
| 0.40 | −0.069 | −0.315 | −0.036 |
| 0.50 | −0.101 | −0.322 | 0.026 |
| 0.60 | −0.131 | −0.256 | 0.109 |
| 0.70 | −0.150 | −0.102 | 0.198 |
| 0.80 | −0.149 | 0.131 | 0.261 |
| 0.90 | −0.122 | 0.400 | 0.266 |
| 1.00 | −0.070 | 0.639 | 0.199 |
| 1.10 | 0.002 | 0.783 | 0.090 |
| 1.20 | 0.084 | 0.835 | 0.030 |
| 1.30 | 0.169 | 0.891 | 0.104 |
| 1.38 | 0.247 | 1.005 | 0.141 |

Note:
the maximum value of Y42 is 1.38 mm

The content of Table 9-4 may be deduced from Table 9-1:

TABLE 9-4

Embodiment 9

| f (mm) | 1.56 | f/f2 + |f/f3| + f/f4 | 4.34 |
|---|---|---|---|
| Fno | 2.20 | |Sag32|/CT3 | 1.74 |
| HFOV (deg.) | 48.6 | |Y11/Y42| | 0.62 |
| V1 + V3 | 45.2 | (T12 + T23 + T34)/Td | 0.23 |
| CT1/CT3 | 2.065 | Sd/Td | 0.71 |
| T12/T23 | 1.928 | Td/ImgH | 1.80 |
| (R7 + R8)/(R7 − R8) | −0.90 | — | — |

It is to be noted that TABLES 1-1 to 9-4 show different data of the different embodiments, however, the data of the different embodiments are obtained from experiments. Therefore, any capturing lens assembly of the same structure is considered to be within the scope of the present disclosure even if it uses different data. The embodiments depicted above and the appended drawings are exemplary and are not intended to limit the scope of the present disclosure.

What is claimed is:

1. An image capturing lens assembly comprising, in order from an object side to an image side along an optical axis:

a first lens element with negative refractive power having an image-side surface being concave at a paraxial region, and an object-side surface;

a second lens element with positive refractive power having an image-side surface being convex at a paraxial region, and an object-side surface;

a third lens element with negative refractive power having an object-side surface being concave at a paraxial region, and an image-side surface being convex at a paraxial region; and a fourth lens element with positive refractive power having an object-side surface being convex at a paraxial region, and an image-side surface being concave at a paraxial region, and at least one of the object-side surface and the image-side surface being aspheric;

wherein T12 is an axial distance between the first lens element and the second lens element, T23 is an axial distance between the second lens element and the third lens element, CT1 is a central thickness of the first lens element, CT3 is a central thickness of the third lens element, and the image capturing lens assembly satisfies following conditions:

$1.05 < T12/T23 < 2.8$; and $1.25 < CT1/CT3 < 4.0$.

2. The image capturing lens assembly according to claim 1, further comprising:

a stop, disposed between the first lens element and the second lens element;

wherein Sd is an axial distance between the stop and the image-side surface of the fourth lens element, Td is an axial distance between the object-side surface of the first lens element and the image-side surface of the fourth lens element, and the image capturing lens assembly further satisfies a following condition:

$0.60 < Sd/Td < 0.85$.

3. The image capturing lens assembly according to claim 2, wherein CT1 is a central thickness of the first lens element, CT3 is a central thickness of the third lens element, and the image capturing lens assembly further satisfies a following condition:

1.50<CT1/CT3<3.0.

4. The image capturing lens assembly according to claim 3, wherein the object-side surface of the first lens element at a paraxial region is convex.

5. The image capturing lens assembly according to claim 4, wherein V1 is an Abbe number of the first lens element, and V3 is an Abbe number of the third lens element, and the image capturing lens assembly further satisfies a following condition:

30<V1+V3<65.

6. The image capturing lens assembly according to claim 4, wherein Sag42 is a distance in parallel with the optical axis from a point on the image-side surface of the fourth lens element to an axial vertex on the image-side surface of the fourth lens element, Y is an off-axis height between a point on the image-side surface of the fourth lens element and the optical axis, and DDsag42 is a second-order derivative of the distance Sag42 with respect to the off-axis height Y and has changed at least once from positive to negative, or vice versa.

7. The image capturing lens assembly according to claim 3, wherein f is a focal length of the image capturing lens assembly, f2 is a focal length of the second lens element, f3 is a focal length of the third lens element, f4 is a focal length of the fourth lens element, and the image capturing lens assembly further satisfies a following condition:

3.8<f/f2+|f/f3|+f/f4<5.5.

8. The image capturing lens assembly according to claim 3, wherein T12 is the axial distance between the first lens element and the second lens element, T23 is the axial distance between the second lens element and the third lens element, T34 is an axial distance between the third lens element and the fourth lens element, Td is the axial distance between the object-side surface of the first lens element and the image-side surface of the fourth lens element, and the image capturing lens assembly further satisfies a following condition:

0.05<(T12+T23+T34)/Td<0.25.

9. The image capturing lens assembly according to claim 8, wherein Sag32 is a distance in parallel with an optical axis from a point on the image-side surface of the third lens element to an axial vertex on the image-side surface of the third lens element, CT3 is the central thickness of the third lens element, and the image capturing lens assembly further satisfies a following condition:

1.1<|Sag32|/CT3<2.5.

10. The image capturing lens assembly according to claim 8, wherein R7 is a curvature radius of the object-side surface of the fourth lens element, R8 is a curvature radius of the image-side surface of the fourth lens element, and the image capturing lens assembly further satisfies a following condition:

−1.8<(R7+R8)/(R7−R8)<−1.0.

11. The image capturing lens assembly according to claim 2, wherein the object-side surface of the second lens element at a paraxial region is convex.

12. The image capturing lens assembly according to claim 11, wherein T12 is the axial distance between the first lens element and the second lens element, T23 is the axial distance between the second lens element and the third lens element, and the image capturing lens assembly further satisfies a following condition:

1.35<T12/T23<2.5.

13. The image capturing lens assembly according to claim 2, wherein Y11 is an effective radius of the object-side surface of the first lens element, Y42 is an effective radius of the image-side surface of the fourth lens element, and the image capturing lens assembly further satisfies a following condition:

0.40<|Y11/Y42|<0.85.

14. An image capturing lens assembly comprising, in order from an object side to an image side along an optical axis:
   a first lens element with negative refractive power having an image-side surface being concave at a paraxial region, and an object-side surface;
   a second lens element with positive refractive power having an image-side surface being convex at a paraxial region, and an object-side surface;
   a third lens element with negative refractive power having an object-side surface being concave at a paraxial region, and an image-side surface being convex at a paraxial region; and
   a fourth lens element with positive refractive power having an object-side surface being convex at a paraxial region, and an image-side surface, and at least one of the object-side surface and the image-side surface being aspheric;
   wherein T12 is an axial distance between the first lens element and the second lens element, T23 is an axial distance between the second lens element and the third lens element, Td is an axial distance between the object-side surface of the first lens element and the image-side surface of the fourth lens element, ImgH is a maximum image height of the image capturing lens assembly, and the image capturing lens assembly satisfies following conditions:

1.05<T12/T23<2.8; and 1.0<Td/ImgH<2.0.

15. The image capturing lens assembly according to claim 14, wherein the object-side surface of the first lens element at a paraxial region is convex, the image capturing lens assembly further comprises a stop disposed between the first lens element and the second lens element, Sd is an axial distance between the stop and the image-side surface of the fourth lens element, Td is the axial distance between the object-side surface of the first lens element and the image-side surface of the fourth lens element, and the image capturing lens assembly further satisfies a following condition:

0.60<Sd/Td<0.85.

16. The image capturing lens assembly according to claim 15, wherein T12 is the axial distance between the first lens element and the second lens element, T23 is the axial distance between the second lens element and the third lens element, and the image capturing lens assembly further satisfies a following condition:

1.35<T12/T23<2.5.

17. The image capturing lens assembly according to claim 16, wherein Td is the axial distance between the object-side surface of the first lens element and the image-side surface of the fourth lens element, ImgH is the maximum image height of the image capturing lens assembly, and the image capturing lens assembly further satisfies a following condition:

1.1<Td/ImgH<1.65.

18. The image capturing lens assembly according to claim 16, wherein V1 is an Abbe number of the first lens element, and V3 is an Abbe number of the third lens element, and the image capturing lens assembly further satisfies a following condition:

$$30 < V1+V3 < 65.$$

19. The image capturing lens assembly according to claim 16, wherein CT1 is a central thickness of the first lens element, CT3 is a central thickness of the third lens element, and the image capturing lens assembly further satisfies a following condition:

$$1.50 < CT1/CT3 < 3.0.$$

20. The image capturing lens assembly according to claim 16, wherein Y11 is an effective radius of the object-side surface of the first lens element, Y42 is an effective radius of the image-side surface of the fourth lens element, and the image capturing lens assembly further satisfies a following condition:

$$0.40 < |Y11/Y42| < 0.85.$$

21. The image capturing lens assembly according to claim 15, wherein f is a focal length of the image capturing lens assembly, f2 is a focal length of the second lens element, f3 is a focal length of the third lens element, f4 is a focal length of the fourth lens element, and the image capturing lens assembly further satisfies a following condition:

$$3.8 < f/f2 + |f/f3| + f/f4 < 5.5.$$

22. The image capturing lens assembly according to claim 21, wherein fx and fy are any two focal lengths out of the second, third, and fourth lens elements, and the image capturing lens assembly further satisfies following conditions:

$$0.75 < |fx/fy| < 1.33;$$

x is equal to 2, 3, or 4;
y is equal to 2, 3, or 4; and
x≠y.

23. The image capturing lens assembly according to claim 22, wherein Sag42 is a distance in parallel with the optical axis from a point on the image-side surface of the fourth lens element to an axial vertex on the image-side surface of the fourth lens element, Y is an off-axis height between a point on the image-side surface of the fourth lens element and the optical axis, and DDsag42 is a second-order derivative of the distance Sag42 with respect to the off-axis height Y and has changed at least once from positive to negative, or vice versa.

24. The image capturing lens assembly according to claim 22, wherein Sag32 is a distance in parallel with an optical axis from a point on the image-side surface of the third lens element to an axial vertex on the image-side surface of the third lens element, CT3 is a central thickness of the third lens element, and the image capturing lens assembly further satisfies a following condition:

$$1.1 < |Sag32|/CT3 < 2.5.$$

25. An image capturing lens assembly comprising, in order from an object side to an image side along an optical axis:
a first lens element with negative refractive power having an object-side surface being convex at a paraxial region, and an image-side surface being concave at a paraxial region;
a second lens element with positive refractive power having an image-side surface being convex at a paraxial region, and an object-side surface;
a third lens element with negative refractive power having an object-side surface being concave at a paraxial region, and an image-side surface being convex at a paraxial region; and
a fourth lens element with positive refractive power having an object-side surface being convex at a paraxial region, and an image-side surface, and at least one of the object-side surface and the image-side surface being aspheric;
wherein T12 is an axial distance between the first lens element and the second lens element, T23 is an axial distance between the second lens element and the third lens element, Td is an axial distance between the object-side surface of the first lens element and the image-side surface of the fourth lens element, ImgH is a maximum image height of the image capturing lens assembly, CT1 is a central thickness of the first lens element, CT3 is a central thickness of the third lens element, Sag42 is a distance in parallel with the optical axis from a point on the image-side surface of the fourth lens element to an axial vertex on the image-side surface of the fourth lens element, Y is an off-axis height between a point on the image-side surface of the fourth lens element and the optical axis, DDsag42 is a second-order derivative of the distance Sag42 with respect to the off-axis height Y and has changed at least once from positive to negative, or vice versa, and the image capturing lens assembly satisfies following conditions:

$$1.05 < T12/T23 < 2.8;$$

$$1.0 < Td/ImgH < 2.0;\ \text{and}$$

$$1.0 < CT1/CT3 < 5.0.$$

26. The image capturing lens assembly according to claim 25, wherein T12 is the axial distance between the first lens element and the second lens element, T23 is the axial distance between the second lens element and the third lens element, T34 is an axial distance between the third lens element and the fourth lens element, Td is the axial distance between the object-side surface of the first lens element and the image-side surface of the fourth lens element, and the image capturing lens assembly further satisfies a following condition:

$$0.05 < (T12+T23+T34)/Td < 0.25.$$

27. The image capturing lens assembly according to claim 25, wherein R7 is a curvature radius of the object-side surface of the fourth lens element, R8 is a curvature radius of the image-side surface of the fourth lens element, and the image capturing lens assembly further satisfies a following condition:

$$-1.8 < (R7+R8)/(R7-R8) < -0.7.$$

28. The image capturing lens assembly according to claim 25, wherein f is a focal length of the image capturing lens assembly, f2 is a focal length of the second lens element, f3 is a focal length of the third lens element, f4 is a focal length of the fourth lens element, and the image capturing lens assembly further satisfies a following condition:

$$3.8 < f/f2 + |f/f3| + f/f4 < 5.5.$$

29. The image capturing lens assembly according to claim 28, wherein fx and fy are any two focal lengths out of the second, third, or fourth lens elements, and the image capturing lens assembly further satisfies following conditions:

$$0.75 < |fx/fy| < 1.33;$$

x is equal to 2, 3, or 4;
y is equal to 2, 3, or 4; and
x≠y.

30. The image capturing lens assembly according to claim 25, wherein Y11 is an effective radius of the object-side surface of the first lens element, Y42 is an effective radius of the image-side surface of the fourth lens element, and the image capturing lens assembly further satisfies a following condition:

$0.40 < |Y11/Y42| < 0.85$.

* * * * *